United States Patent [19]

Nagasaki et al.

[11] Patent Number: 5,083,150
[45] Date of Patent: Jan. 21, 1992

[54] AUTOMATIC FOCUSING APPARATUS

[75] Inventors: Tatsuo Nagasaki, Yokohama; Yasuhiro Komiya, Hachioji, both of Japan

[73] Assignee: Olympus Optical Co., Ltd., Tokyo, Japan

[21] Appl. No.: 485,646

[22] Filed: Feb. 27, 1990

[30] Foreign Application Priority Data

Mar. 3, 1989 [JP] Japan .................................. 1-51423
Dec. 8, 1989 [JP] Japan .................................. 1-319473
Dec. 12, 1989 [JP] Japan .................................. 1-320625

[51] Int. Cl.$^5$ .......................... G03B 3/00; G03B 13/18
[52] U.S. Cl. ...................................... 354/402; 358/227
[58] Field of Search ............... 354/402, 403, 404, 405, 354/406; 358/227

[56] References Cited

U.S. PATENT DOCUMENTS 4,183,642  1/1980  Fukuoka .
4,422,097  12/1983  Inuiya .
4,843,413  6/1989  Walther .
4,903,135  2/1990  Ohtake et al. .

FOREIGN PATENT DOCUMENTS 58-215176  12/1983  Japan .
61-32669  2/1986  Japan .
61-107312  5/1986  Japan .

OTHER PUBLICATIONS

NHK Technical Report, vol. 17, No. 1 (Ser. No. 86), pp. 21-37, 1965.
Minolta Techno Report (1986), Focus Detection by Phase Difference Method, T. Ishida, pp. 33-39.

*Primary Examiner*—Donald A. Griffin
*Assistant Examiner*—Le Nguyen
*Attorney, Agent, or Firm*—Frishauf, Holtz, Goodman & Woodward

[57] ABSTRACT

An automatic focusing apparatus of this invention includes a photographing optical system for forming an optical image of an object, an image pickup element for converting the optical image formed by the photographing optical system into an electrical signal, a drive circuit for changing a relative position between the photographing optical system and the image pickup element, a reading circuit for reading the electrical signals at different relative positions as image signals from the image pickup element, a frequency extracting circuit for extracting frequency components of the same specific bands from the image signals read by the reading circuit (34), a focusing signal generator for adding the plurality of frequency components extracted by the frequency extracting circuit to generate a focusing signal, a filtering circuit for filtering the focusing signal to generate a filtering signal, and a microprocessor for performing an in-focus detection operation using a plurality of signal values of the filtering signal, calculating a defocus amount, and outputting a control signal to the drive circuit.

22 Claims, 34 Drawing Sheets

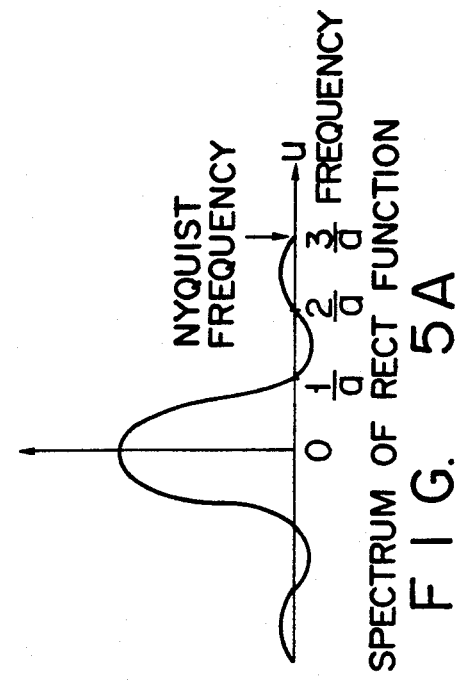
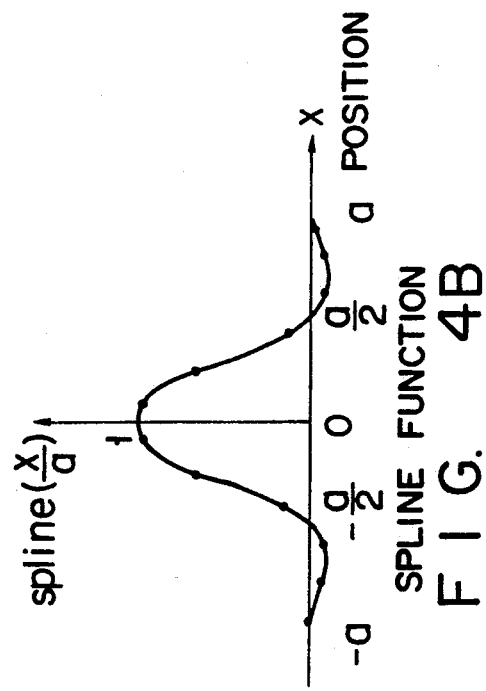
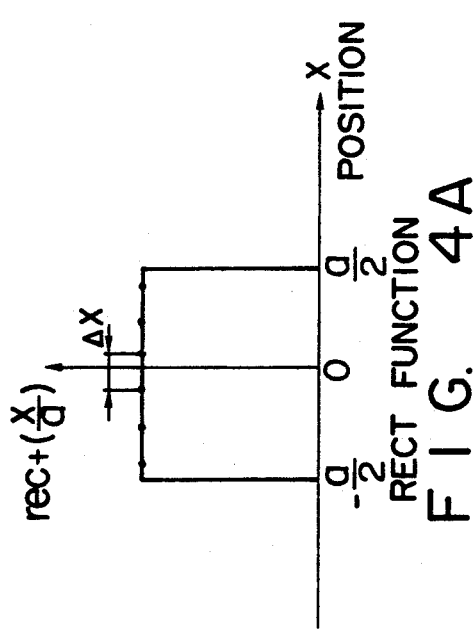

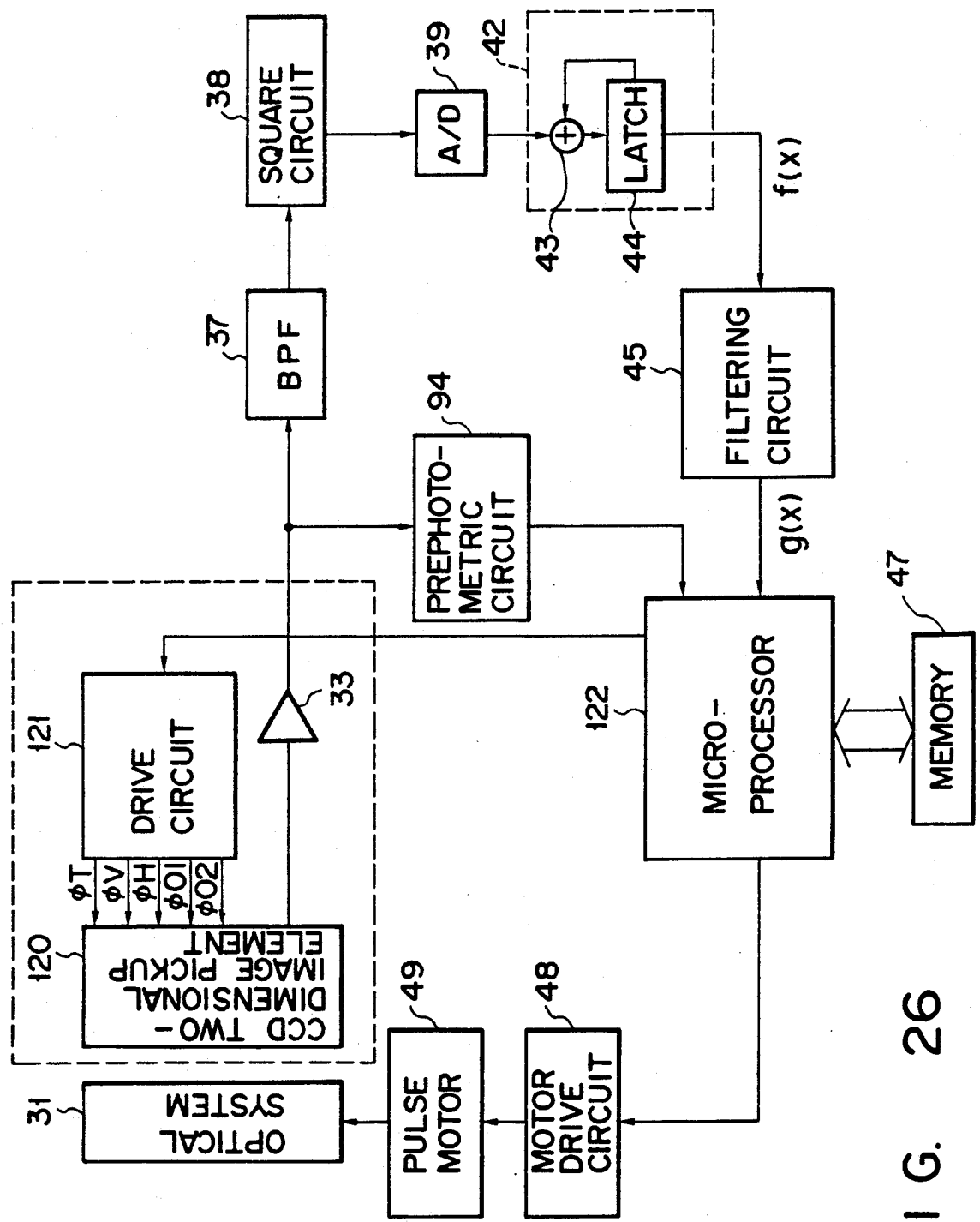
F I G. 26

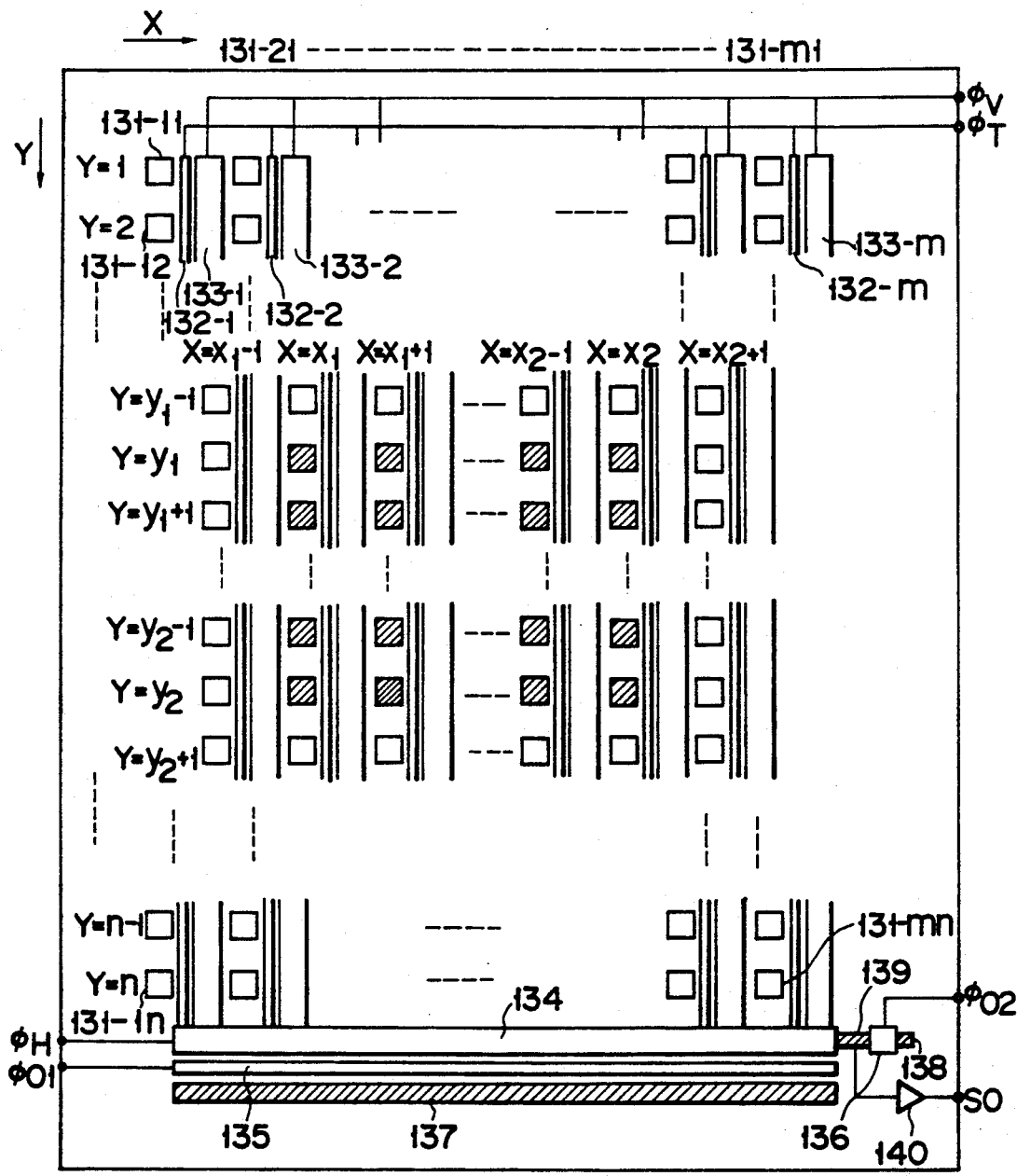
F I G. 27

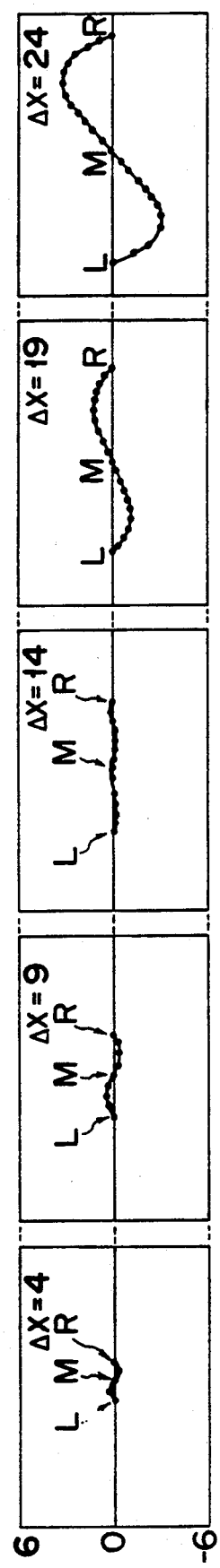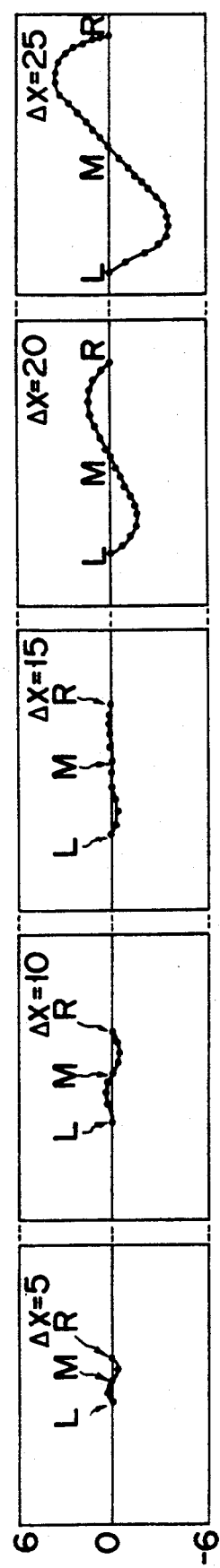
FIG. 29D
FIG. 29E

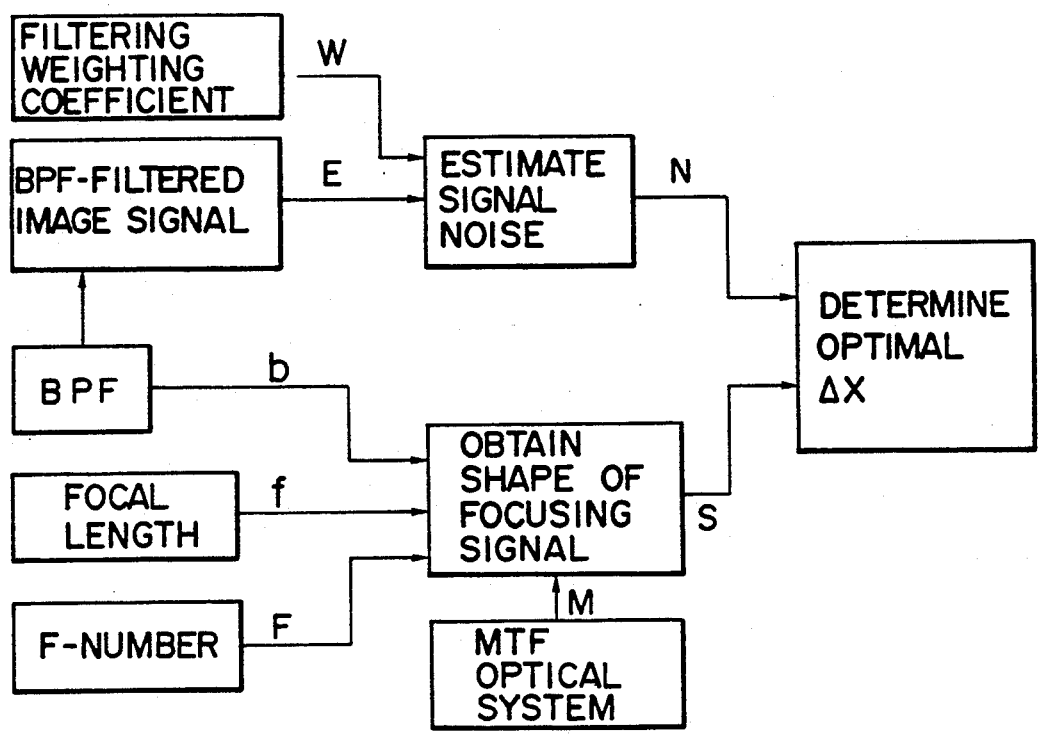
F I G. 31
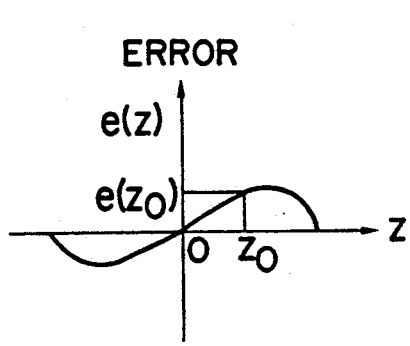
F I G. 32A
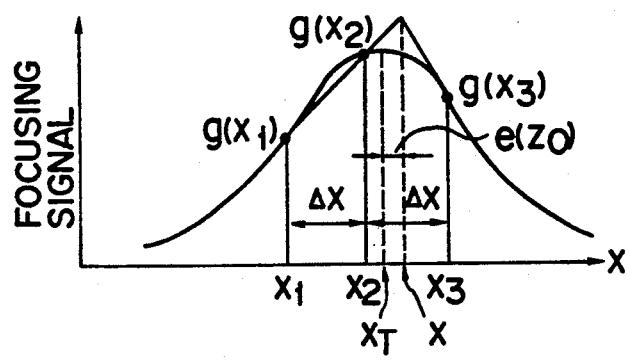
F I G. 32B

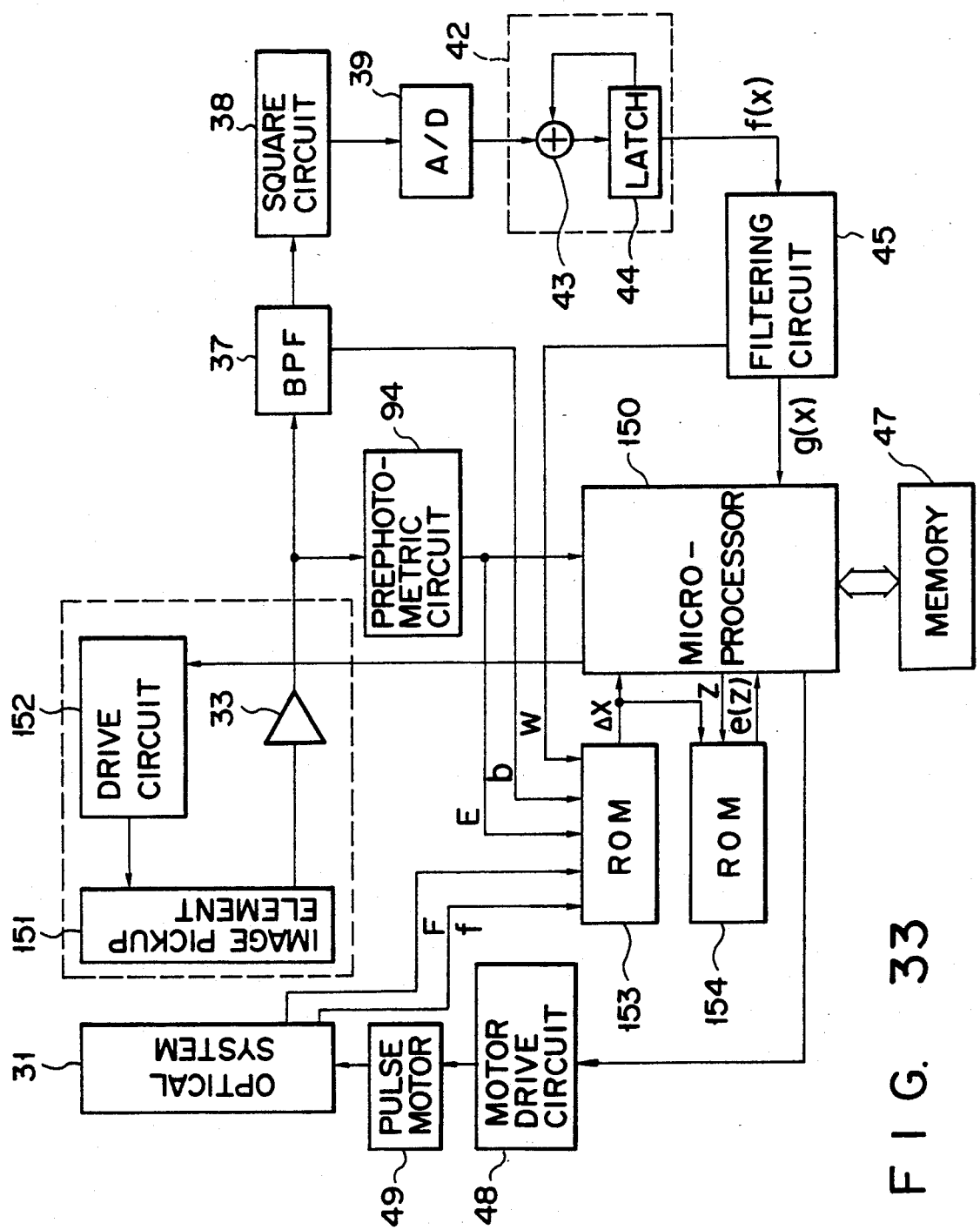
F I G. 33

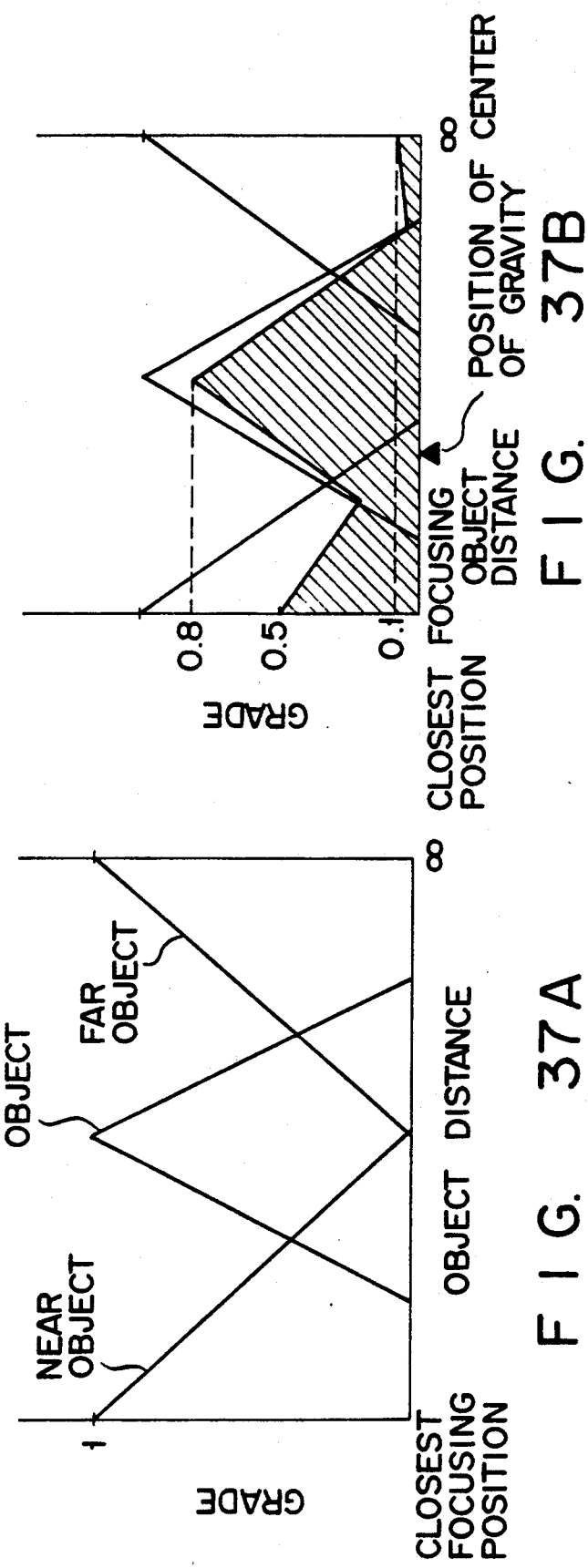

AUTOMATIC FOCUSING APPARATUS

BACKGROUND OF THE INVENTION

1. Field of the Invention

The present invention relates to an automatic focusing apparatus for a camera, which performs focus adjustment in accordance with a so-called hill-climbing scheme.

2. Description of the Related Art

A so-called "hill-climbing" type automatic focusing scheme is known as a conventional scheme wherein an image picked up by a photographing optical system is formed on an image pickup element, a predetermined frequency component is extracted from the image signal output from the image pickup element, and the photographing optical system is moved to a position where an output amplitude of the extracted frequency component becomes maximum, thereby performing focus adjustment.

An automatic focusing apparatus for a television camera which employs the above hill-climbing scheme is described in NHK Technical Report, Vol 17, No. 1 (Serial Number 86), pp. 21–37, 1965.

An automatic focusing apparatus employing the hill-climbing scheme described in the above reference will be described with reference to FIGS. 38 and 39.

FIG. 38 is a block diagram showing an arrangement of the above automatic focusing apparatus. An object image picked up by a photographing optical system 1 is focused on an image pickup element 2 and is photoelectrically converted into a video signal. This video signal is output from the image pickup element 2 and is amplified by a preamplifier 3. The amplified signal is input to a band-pass filter (to be referred to as a BPF hereinafter) 4, and the BPF 4 extracts a predetermined frequency component. An output amplitude of the extracted frequency component is detected by a detector 5 and a peak detector 6. Output amplitude characteristics of the video signal frequency component extracted by the BPF 4 are shown in FIG. 39. As shown in FIG. 39, the output amplitude of the video signal has a maximum value at an in-focus position. The output amplitude having this characteristic curve is held by a sample/hold circuit 7 in units of fields of the video signal. The sampled/held signal is output to a one-field delay circuit 8 and a comparator 9. The comparator 9 compares a value previously held and supplied from the one-field delay circuit 8 with a value currently held and supplied from the sample/hold circuit 7. The comparator 9 controls a motor drive circuit 10 to move the photographing optical system in a direction to increase the output amplitude on the basis of the comparison result. The photographing optical system 1 is moved to the in-focus position by a motor 11.

For example, in the focusing apparatus, when the amplitude value of the previously held output has a level A (FIG. 39) and the amplitude value of the currently held output has a level B (FIG. 39), the comparator 9 determines condition A < B. In this case, the comparator 9 controls the motor drive circuit 10 to continuously move the photographing optical system 1 in the same direction as described above, so that the photographing optical system comes close to the in-focus position. When the output amplitude value supplied from the sample/hold circuit 7 to the comparator 9 reaches the E level, the comparator 9 determines condition D > E. That is, the comparator 9 determines that the photographing optical system 1 has passed the in-focus position. The drive direction of the motor 11 is reversed, and the photographing optical system 1 is moved in the direction of the in-focus position. These operations are repeated to reciprocate the photographing optical system 1 near the in-focus position. When a steady state is obtained, focusing is completed.

Another conventional focusing method is a phase correlation scheme for performing focusing adjustment by using two light beams which pass different pupil positions of a photographing optical system. This phase correlation scheme is described in, e.g., Minolta Techno Report (1986).

FIG. 40 is a block diagram showing an arrangement of an automatic focusing apparatus employing the phase correlation scheme. Referring to FIG. 40, reference numeral 21 denotes a photographing lens. An object image picked up by this photographing lens 21 is temporarily focused on a focusing plane F and is then focused on image pickup elements 23a and 23b by separator lenses 22a and 22b again. Reference numerals 24a and 24b denote aperture masks having functions of causing light beams having specific f-numbers to pass through. Image signals obtained by photoelectric conversion by the image pickup elements 23a and 23b are amplified by preamplifiers 25a and 25b, respectively. The amplified signals are A/D-converted by A/D converters 26a and 26b, respectively. The obtained digital signals are then input to a microprocessor 27. The microprocessor 27 calculates an interimage distance d of the object images respectively formed on the image pickup elements 23a and 23b. The microprocessor 27 outputs a control signal to a motor drive circuit 28 to drive a motor 29, thereby performing focus adjustment. In this case, when a focusing state is a near-focus state, the interimage distance is short. To the contrary, when a focusing state is a far-focus state, this distance is long. The microprocessor 27 calculates an interimage distance by using a correlation algorithm and detects a defocus amount and a focusing direction.

In the automatic focusing apparatus employing the hill-climbing scheme shown in FIG. 38, output amplitude values of the video signals phase-shifted by one field are compared, and a one-field period is required for one focusing cycle. The focusing period of the automatic focusing apparatus for a camera is excessively long.

The output amplitude of the frequency component extracted by the BPF 4 does not always provide a smooth curve by causes such as electrical noise, hand vibrations, and an abrupt change in object (e.g., an object instantaneously passes across the field). As shown in FIG. 41, for example, the amplitude curve has a plurality of peaks P1 to P4. When focus adjustment is performed by the hill-climbing scheme using such an output amplitude curve described above, the peaks P1 to P4 are undesirably determined as in-focus positions, thus greatly degrading focusing precision.

In the automatic focusing apparatus employing the phase correlation scheme, incident light to be incident on predetermined areas is cut by the aperture masks 24a and 24b, and an amount of incident light is greatly reduced. For this reason, a charge accumulation time of the image pickup elements 23a and 23b must be prolonged to obtain an optimal exposure value for a dark object. At the same time, the photographing optical system cannot be driven during charge accumulation, and the focusing operation requires a longer period.

In the phase correlation operation, an accurate interimage distance cannot be obtained for an object having a cyclic pattern, and focusing precision is undesirably degraded.

Published Unexamined Japanese Patent Application No. 61-32669 discloses a method of adding horizontal scanning line signals preceding and succeeding an image having a low S/N ratio (e.g., a dark image) to increase the S/N ratio of the signal. This method, however, may have a disadvantage of a decrease in S/N ratio of the signal when the preceding and succeeding horizontal scanning lines have a low degree of correlation.

In order to cope with a case wherein the amplitude curve of the output from the BPF 4 has the plurality of peaks P1 to P4, a means is disclosed to detect a change in object by a change in aperture value, interrupt focus adjustment for a predetermined period of time when the aperture value is abruptly changed, and then start focus adjustment again, as disclosed in Published Unexamined Japanese Patent Application No. 58-215176. Unexamined Japanese Patent Application No. 61-107312 discloses a means for monitoring a change in evaluation function sampled every predetermined period, and detecting a change in distance between a lens and the object when the evaluation function is changed with a predetermined level by n (n≧2) times. The means disclosed in these prior art specifications require a long focusing period.

SUMMARY OF THE INVENTION

It is an object of the present invention to provide an automatic focusing apparatus which can perform focus adjustment at a high speed with high precision without being adversely affected by an object state.

According to the present invention, there is provided an automatic focusing apparatus comprising a photographing optical system for forming an optical image of an object, an image pickup element for converting the optical image of the object formed by the photographing optical system into an electrical signal, a drive circuit for changing a relative position between the photographing optical system and the image pickup element, a reading circuit for reading the electrical signals at different relative positions as image signals, a frequency extraction circuit for extracting a frequency component of a specific band of the image signal read by the reading circuit, a focusing signal generator for adding the plurality of frequency components extracted by the frequency extraction circuit and generating a focusing signal, a filtering circuit for filtering the focusing signal to generate a filtering signal, and a microprocessor for calculating a defocus amount by an interpolation operation using a plurality of signal values of the filtering signal and for outputting a drive signal to the drive circuit.

In the automatic focusing apparatus of the present invention, the object image is formed on the image pickup element by the photographing optical system. The image signal is read by the reading circuit from the image pickup element. A frequency component having a specific band is extracted from the image signal by the frequency extraction circuit. The output amplitude of the extracted frequency component is detected by the focusing signal generator. The focusing signal generator adds the output amplitude values corresponding to the plurality of image signals and generates the focusing signal. The focusing signal is filtered by the filtering circuit. As a result, the S/N ratio of the focusing signal can be increased, and at the same time the filtering signal whose peak is controlled is generated. An interpolation operation using a plurality of points near the maximum value of the filtering signal is performed to calculate the in-focus position. The defocus amount to the in-focus position calculated by the interpolation operation is output to the drive circuit as the drive signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4A is a graph showing a rect function;

FIG. 4B is a view showing a spline function;

FIG. 5A is a graph showing a spectrum of a rect function;

FIG. 5B is a graph showing a spectrum of the spline function;

FIG. 26 is a block diagram showing an automatic focusing apparatus according to the fifth embodiment of the present invention;

FIG. 27 is a view showing an arrangement of a CCD two-dimensional image pickup element;

FIGS. 29A to 29E are views showing relationships between error amounts and interpolation positions, respectively;

FIG. 31 is a flow chart for detecting an optimal position in interpolation operations;

FIG. 32A is a graph showing an error amount in the interpolation operation;

FIG. 32B is a view showing a relationship between the interpolated focusing signal and the in-focus position;

FIG. 33 is a block diagram showing an automatic focusing apparatus according to the sixth embodiment of the present invention;

FIG. 37A is a view showing a membership function used in inference 2;

FIG. 37B is a view for explaining a calculation for obtaining the center of gravity;

DETAILED DESCRIPTION OF THE PREFERRED EMBODIMENTS

Figure 1:
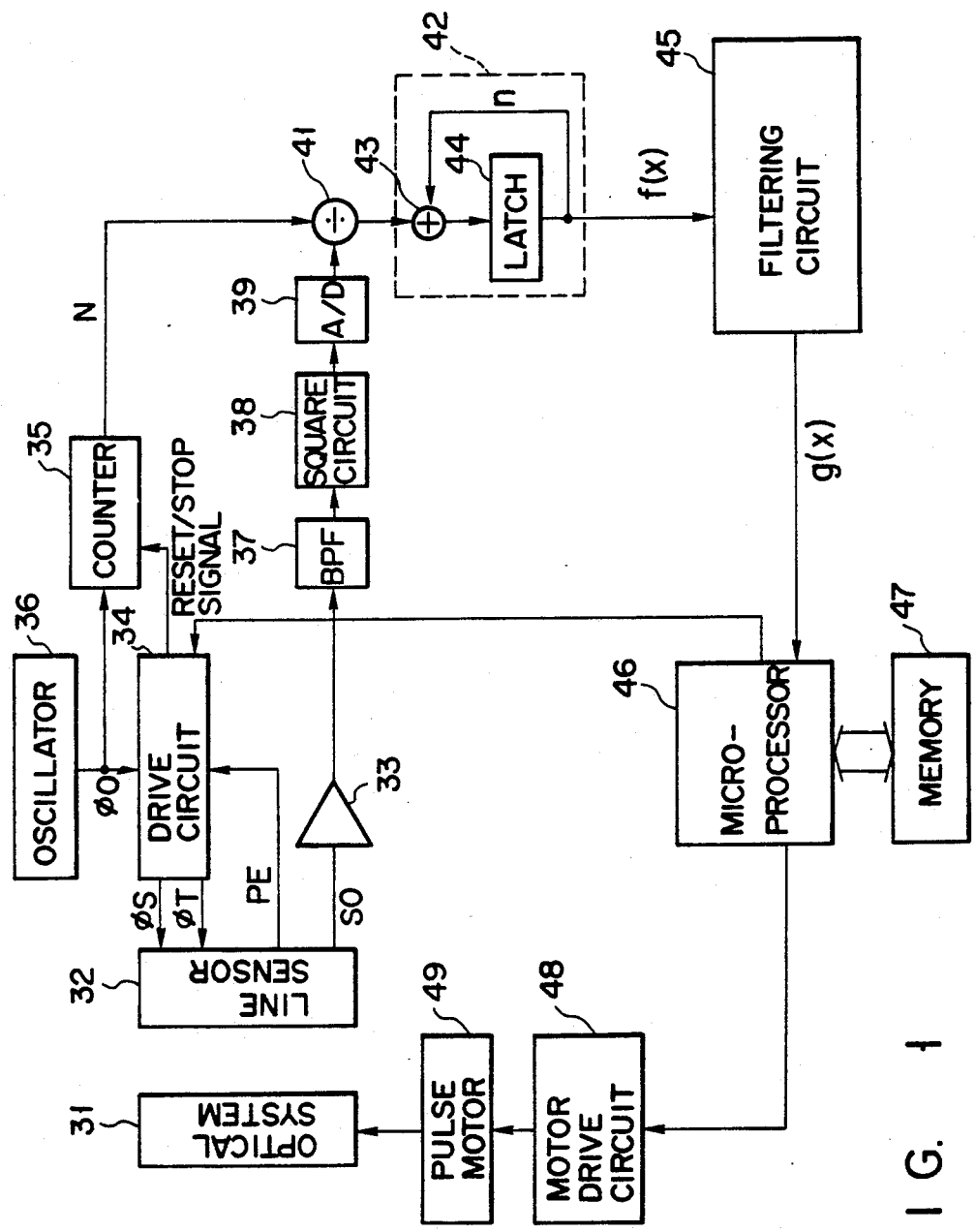
FIG. 1 is a block diagram of an automatic focusing apparatus according to the first embodiment of the present invention.
Figure 2:
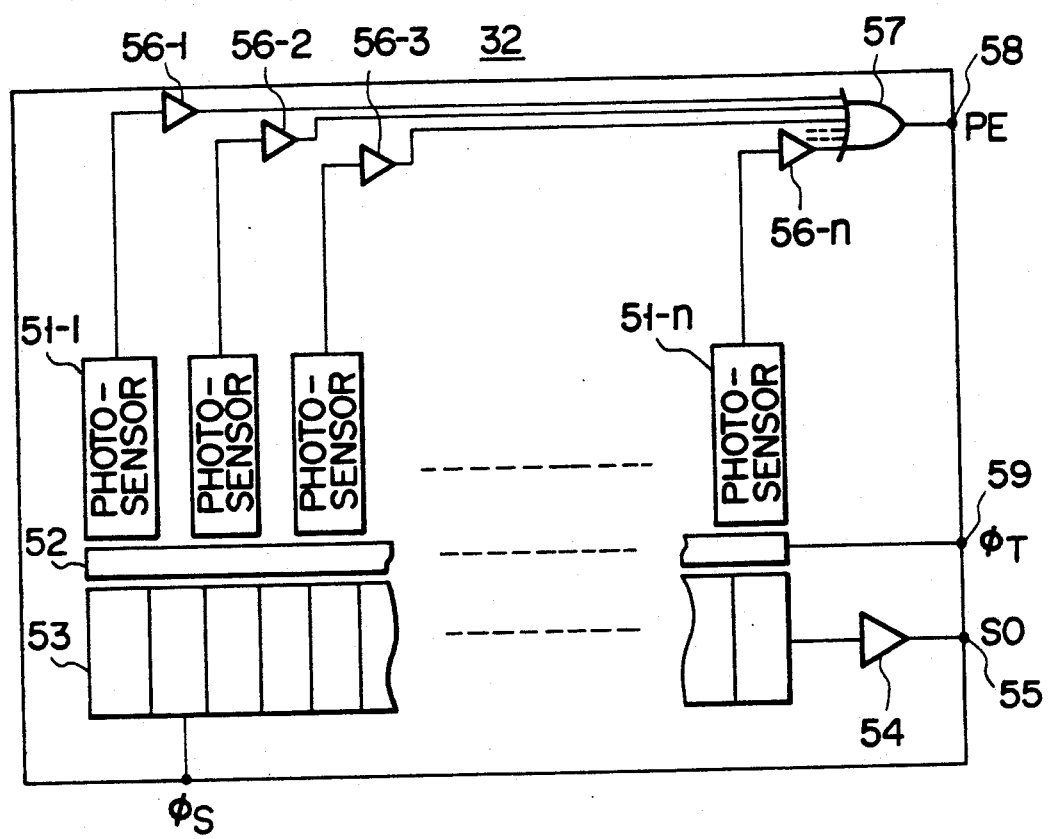
FIG. 2 is a view showing an arrangement of a line sensor.

FIG. 1 is a view showing an arrangement of an automatic focusing apparatus according to the first embodiment. Reference numeral 31 in FIG. 1 denotes a photographing optical system. An image formed by the photographing optical system 31 is focused on a line sensor 32 including a CCD and the like. The line sensor 32 outputs a charge accumulated within a predetermined period of time to a preamplifier 33 as an image signal SO. At the same time, the line sensor 32 outputs a peak signal PE representing an accumulation charge amount to a drive circuit 34. A detailed arrangement of the line sensor 32 is shown in FIG. 2. In the line sensor 32, n photosensors 51-1 to 51-n are aligned in an array, and a CCD shift register 53 is arranged through a transfer gate 52 on one side of the array of the photosensors 51-1 to 51-n. The shift register 53 is connected to a terminal 55 through an output amplifier 54, and an image signal appears at the terminal 55. Each of the aligned photosensors 51-1 to 51-n is connected to a peak detector 57 through a corresponding one of buffers 56-1 to 56-n. The peak detector 57 selects a peak value from the signals output from the photosensors 51-1 to 51-n and outputs a peak signal PE from a terminal 58. A drive pulse (to be described later) $\phi T$ is input to a terminal 59 connected to the transfer gate 52.

The drive circuit 34 is arranged for the line sensor 32 and outputs a clock pulse $\phi s$ and the drive pulse $\phi T$ to the line sensor 32. When a reset signal and the peak signal PE reach saturation levels, the drive circuit 34 outputs a count stop signal to a counter 35. The counter 35 counts clock pulses $\phi O$ output from an oscillator 36 and outputs a count N to a divider (to be described later). An image signal amplified by the preamplifier 33 is input to a BPF 37. The BPF 37 extracts a predetermined frequency component of an image signal and outputs it to a square circuit 38. The square circuit 38 converts the frequency component extracted by the BPF 37 into a positive value and outputs at as a signal. This signal output from the square circuit 38 is A/D-converted by an A/D converter 39. The digital signal is then output to a divider 41. The divider 41 divides the digital data from the A/D converter 39 by the count N supplied from the counter 35 and corrects the image signal in correspondence with the accumulation time. A quotient from the divider 41 is output to an integrator 42. The integrator 42 comprises an adder 43 and a latch 44. The integrator 42 adds the detection signals by the number (n) corresponding to several pixels to detect a focusing signal f(x) and outputs the focusing signal to a filtering circuit 45. The filtering circuit 45 performs filtering processing (to be described later), and the filtered focused signal (to be referred to as a filtering signal hereinafter) g(x) is output to a microprocessor 46. The microprocessor 46 causes a memory 47 to store the filtering signal g(x) sent from the filtering circuit 45 and performs arithmetic operations for calculating a focusing state and an in-focus position by using the filtering signal g(x) stored in the memory 47. Reference numeral 48 denotes a motor drive circuit for driving a pulse motor 49 on the basis of a control signal sent from the microprocessor 46. The pulse motor 49 moves the photographing optical system 31 in the direction of the optical axis.

Characteristic signal processing of this embodiment will be described below.

Figure 3:
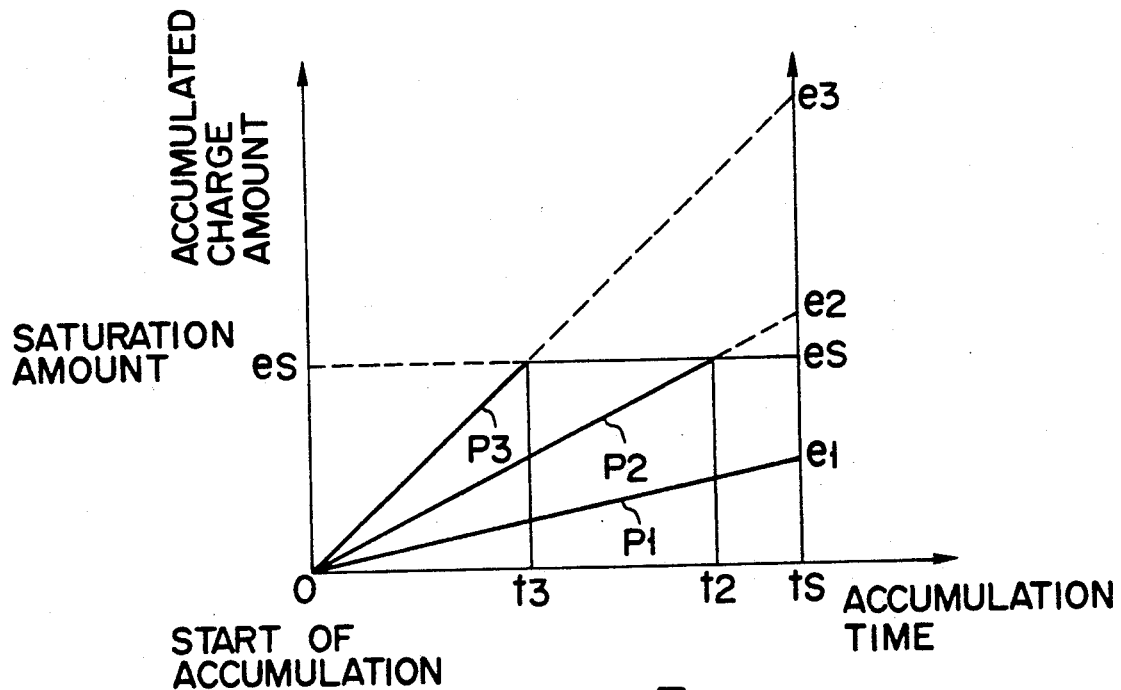
FIG. 3 is a graph showing a relationship between a charge accumulation time and a saturation amount in an image pickup element.

In this embodiment, in order to prevent a decrease in S/N ratio upon accumulation saturation of the line sensor 32, accumulation of the line sensor 32 is stopped when the peak signal PE output from the line sensor 32 is saturated, and a read operation is performed. At the same time, an image signal value is calculated in accordance with a period obtained until the line sensor 32 is saturated. The image signal is corrected in accordance with the calculated value. This operation will be described in detail with reference to FIG. 3. FIG. 3 shows the relationship between the charge accumulation amount and the accumulation time of the line sensor 32. The charge accumulation time is plotted along the abscissa, and the accumulation charge amount is plotted along the ordinate. Reference symbol $t_s$ denotes a unit accumulation time which is equal to a detection time interval for the focusing signal; and $e_s$, a saturation amount of the accumulated charge. Assume that the accumulated charges at the maximum signal positions of three types of images $i_1(r)$, $i_2(r)$, and $i_3(r)$ (where r is the position of the line sensor 32) change as indicated by lines $P_1$, $P_2$, and $P_3$.

The image $i_1(r)$ is not saturated since its peak value $e_l < e_s$. The accumulation charge amount during the unit accumulation time $t_s$ satisfies condition $i_1(r) < e_s$ at the line sensor position r. The signal peaks of the images $i_2(r)$ and $i_3(r)$ are saturated. More specifically, the charge accumulation operations of the images $i_2(r)$ and $i_3(r)$ are stopped at peak value saturation times $t_2$ and $t_3$, are read operations are started. These values are converted into values during the unit accumulation time $t_s$ as follows:

$$i'_2(r) = i_2(r) \times t_s/t_2$$
$$i'_3(r) = i_3(r) \times t_s/t_3$$

or simply $$i'_2(r) = i_2(r) \times t_s/t_2$$
$$i'_3(r) = i_3(r) \times t_s/t_3$$

or simply $$i'_1(r) = i_1(r)/t_s$$
$$i'_2(r) = i_2(r)/t_2$$
$$i'_3(r) = i_3(r)/t_3$$

That is, the divider 41 divides each image signal by the count N serving as the accumulation time to correct errors caused by differences in accumulation time.

For example, this correction prevents overexposure from occurring at the time of focusing within a proper exposure time determined at the of non-focusing and allows a signal value exposed for the same period of time to be produced. It is thus possible to correctly compare the signals produced at the time of non-focusing and focusing.

Filtering processing of the filtering circuit 45 will be described below. h(x) is given as a filter function, and * is defined as a convolution symbol. Under these conditions, the filtering signal g(x) is given as follows:

$$g(x) = f(x) * h(x) \qquad (1)$$

The filter function h(x) can be a rect function, a spline function, a sinc function, or the like. The rect and spline functions are given as rect(x/a) and spline(x/a), respectively:

$$\text{rect}(x/a):$$
$$|X| \leq a/2 \ \text{rect}(x/a) = 1 \qquad (2)$$
$$|X| \geq a/2 \ \text{rect}(x/a) = 2$$

$$\text{spline}(x/a):$$
$$|X| > a/2 \ \text{spline}(x/2) = (2/ax)^3 - 2(2/ax)^2 + 1$$
$$a/2 < |X| \leq a \ \text{spline}(x/a) = -(2/ax)^3 +$$
$$\qquad\qquad\qquad 5(2/ax)^2 - 8(2/ax) + 4$$
$$|X| > a \ \text{spline}(x/a) = 0 \qquad (3)$$

The shapes of the rect and spline functions thus defined are shown in FIGS. 4A and 4B, respectively. The spectra of these functions are also shown in FIGS. 5A and 5B, respectively. As is apparent from FIGS. 4A and 4B and FIGS. 5A and 5B, both the functions have low-pass filter characteristics. The image signal is filtered by both the functions to suppress high-frequency components such as peaks. When spectra in FIGS. 5A and 5B are compared with each other, the spline function is closer to the low-pass filter function than the rect function. As shown in FIGS. 5A and 5B, for example, when a Nyquist frequency is set to be $u = 3 \times (1/a)$, a sampling pitch $\Delta X$ of the filtering function becomes $(a/2) \times (\Delta$-$) = a/6$. Therefore, filtering processing using the rect function uses six impulse response signals, whereas that using the spline function uses 12 impulse response signals.

Figure 6A:
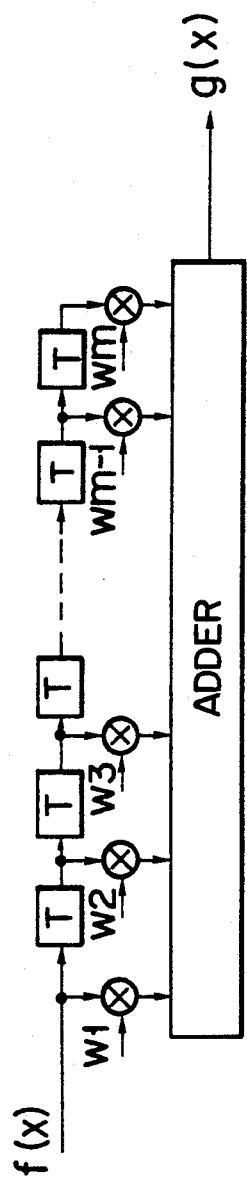
FIG. 6A is a view showing an arrangement of a filtering circuit.
Figure 6B:
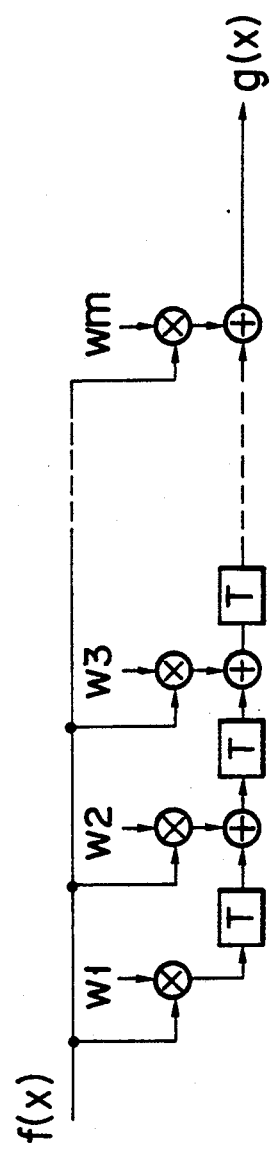
FIG. 6B is a view showing another arrangement of a filtering circuit.
Figure 6C:
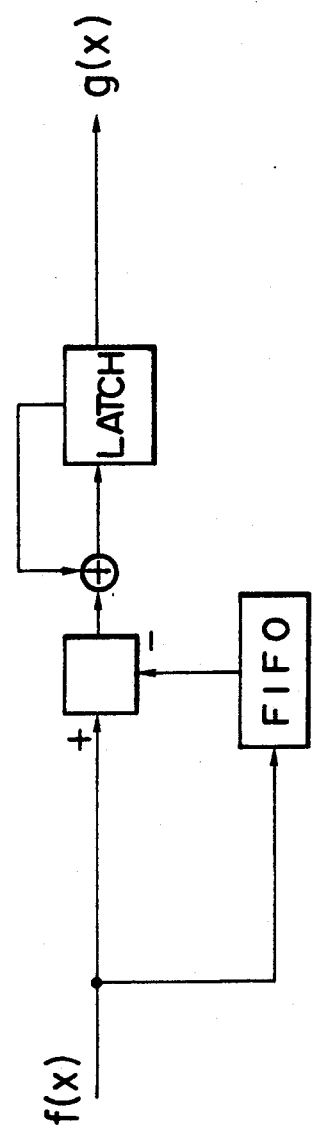
FIG. 6C is a view showing still another arrangement of the filtering circuit.

FIGS. 6A to 6C are block diagrams showing arrangements of the filtering circuit 45. Referring to FIGS. 6A to 6C, reference symbol f(x) denotes an input; and g(x), an output. In the filtering circuit shown in FIG. 6A, a plurality of delay elements T are connected in series with each other to the input, and outputs from the delay elements T are connected to an adder through multipliers whose filter coefficients are respectively set to be $\omega 1$ to $\omega m$.

In the filtering circuit shown in FIG. 6B, adders are respectively inserted between a plurality of series-connected delay elements T. An input f(x) is input to the adders respectively through multipliers whose filter coefficients are set to be ω1 to ωm.

The filtering circuit shown in FIG. 6C can be used when the filter coefficient ω is "1". The input f(x) is input to a FIFO memory and is sequentially delayed. The input f(x) is sequentially subtracted by the outputs from the FIFO memory. The difference is input into an adder and is added to a signal from a latch connected to the output terminal of the adder.

Figure 7:
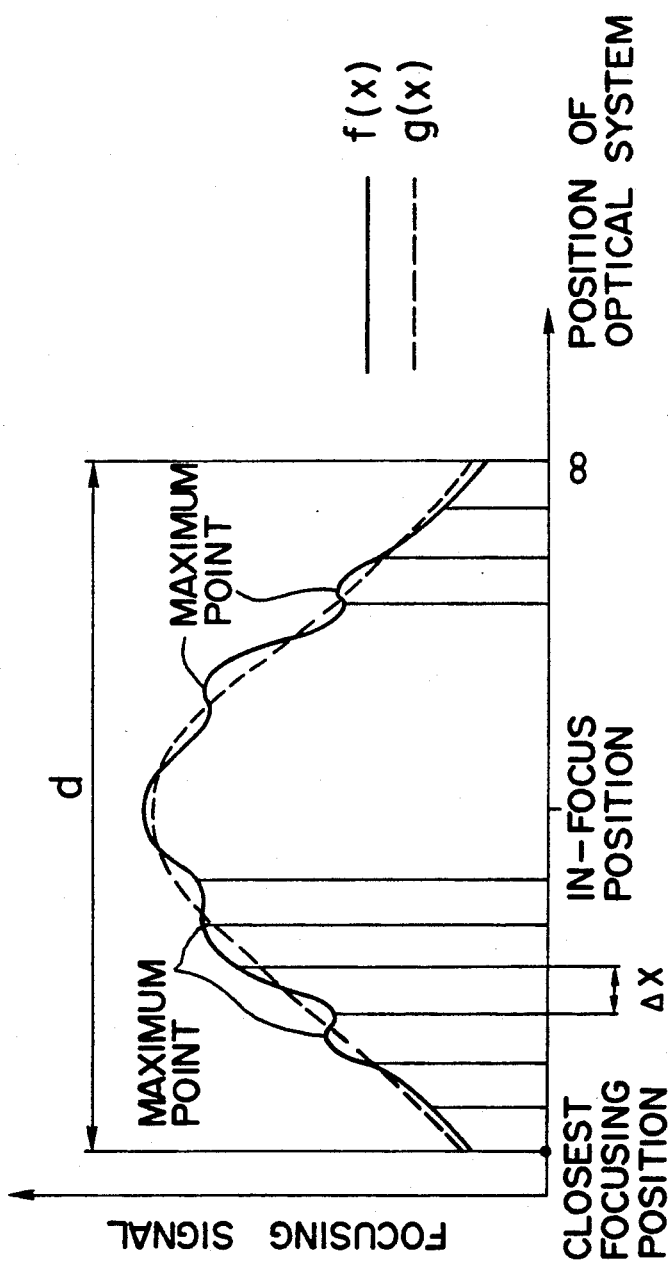
FIG. 7 is a graph showing signal curves of a focusing signal and filtered filtering signal.

In the filtering circuit having the above arrangements, as shown in FIG. 7, the input signal (focusing signal) f(x) having a plurality of peaks, as indicated by a solid line is converted into the filtering signal g(x) whose plurality of peaks are suppressed, as indicated by broken line. Reference symbol ΔX denotes a detection interval for the focusing signal.

Figure 8A:
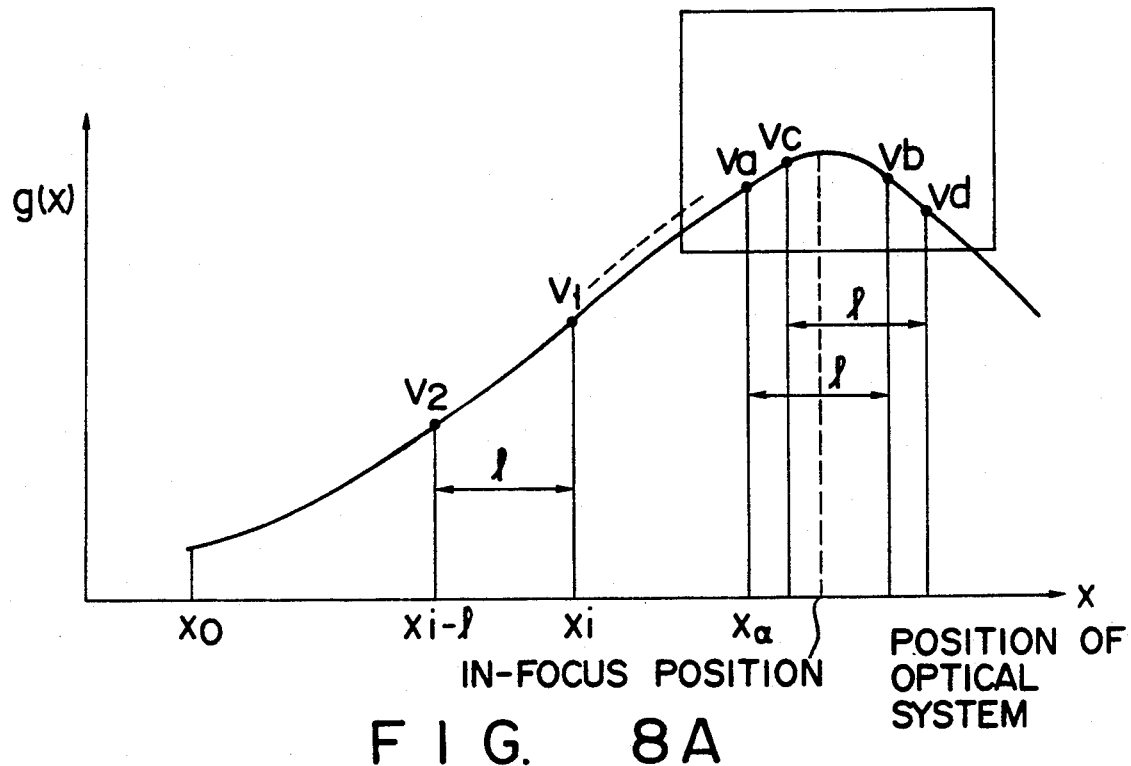
FIG. 8A is a view showing a filtering signal curve used in the above description concerning a method of detecting an in-focus position.
Figure 8B:
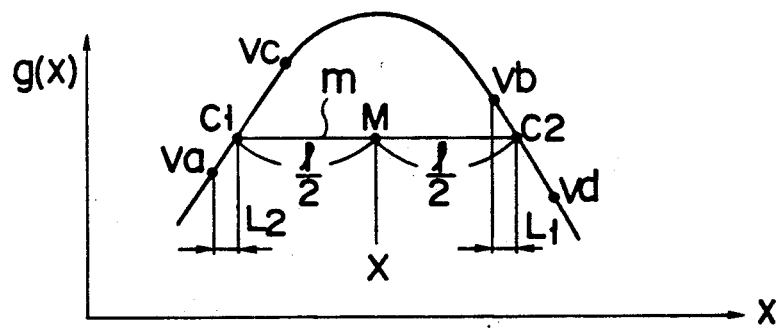
FIG. 8B is a view showing an extracted peak (FIG. 8A) portion of the filtering signal shown in FIG. 8A.

Arithmetic operations for obtaining a focusing state and an in-focus position will be described with reference to FIGS. 8A and 8B. FIG. 8A is a view showing the filtering signal. An output level g(x) of the filtering signal is plotted along the ordinate (Y-axis), and a position X in the direction of the optical axis of the photographing optical system is plotted along the abscissa (X-axis).

Two points g(xi) and g(xl-l) spaced apart by a distance l on the filtering signal in the direction of the X-axis are respectively defined as V1 and V2. Assume that g(xi) is the latest filtering signal value. V1 and V2 are compared with each other. If condition V1>V2 is established, the drive direction of the line sensor 32 is kept unchanged The points V1 and V2 are moved in the direction of the X-axis. The point V1 is moved past the in-focus position, and a position where condition V1<V2 is satisfied is detected A pair of two points (Va and Vb) satisfying condition V1<V2 and interposing the in-focus position therebetween, and a pair of two points (Vc and Vd) satisfying condition V1>V2 are set. The positional relationship between these four points Va, Vb, Vc, and Vd is shown in FIG. 8B. When the four points Va, Vb, Vc, and Vd are set, a line m parallel to the X-axis and crossing line segments VaVc and VbVd is obtained. An intersection between the straight line m and the line segment VaVc is defined as C1, and an intersection between the line m and the line segment VbVd is defined as C2. The Y-axis position of the line m is set such that an X-axis distance L2 between the intersection C1 and the point Va is set to be equal to an X-axis distance L1 between the intersection C2 and the point Vb. A middle point M of the intersections C1 and C2 is obtained, and the X-coordinate of this point is defined as an in-focus position α. This position is represented as follows:

$$\alpha = XV_a + l/2 + \Delta X(V_b - V_a)/(V_c - V_d + V_b - V_a) \quad (I)$$

Equation (I) is calculated by arithmetic operations of the microprocessor 46 to detect the in-focus position. As a result of an experiment, when focus adjustment was performed by the above in-focus position detection method, a detection error on a quadratic function was zero. XVa in equation (I) represents the X-coordinate of the point Va. The distance l is appropriately set in accordance with a defocus amount, an image, a zoom position, and an f-number. For example, when this distance l is long, a difference in filtering signal g(x) is increased, and an S/N ratio can be easily calculated.

Figure 9:
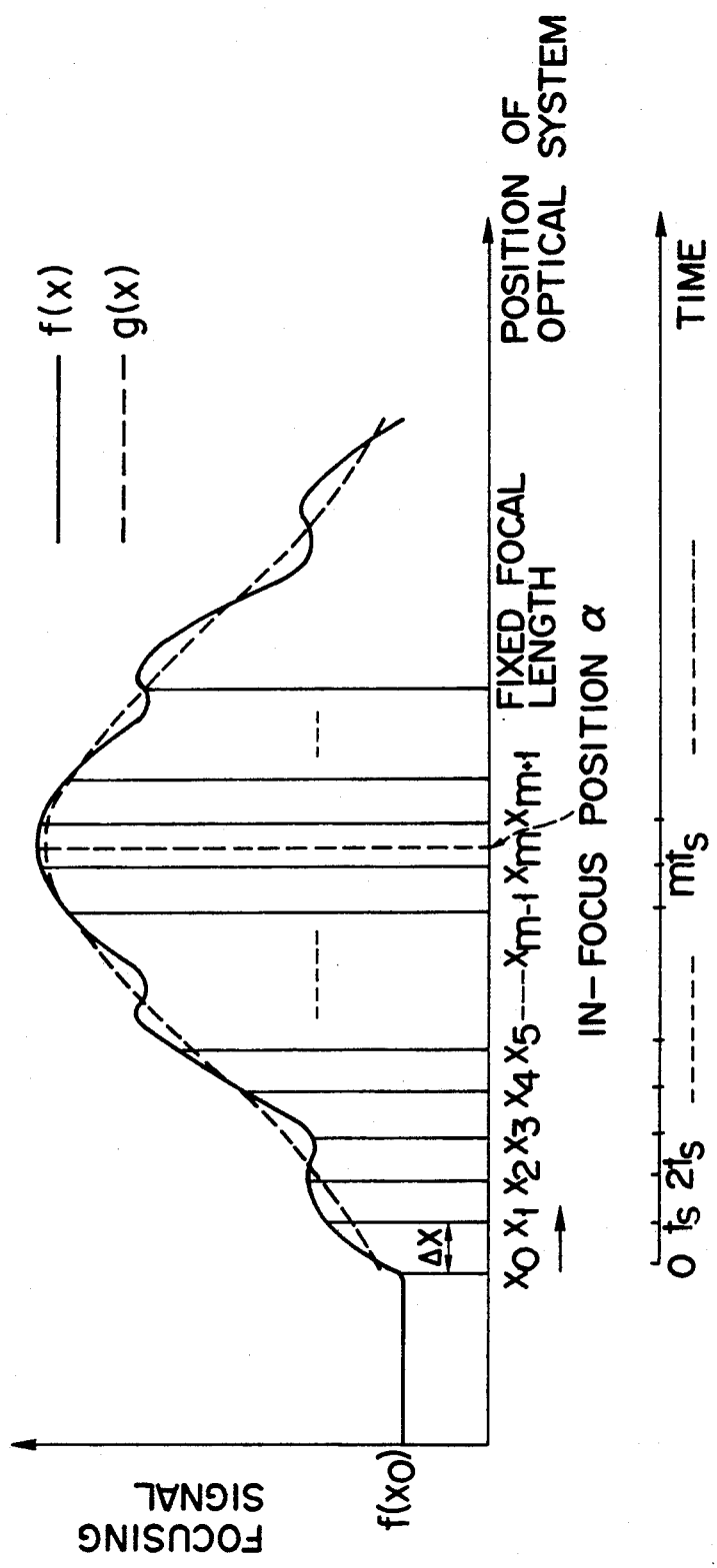
FIG. 9 is a graph showing a read time, and focusing and filtering signals in correspondence with the focusing signal detection time.

An operation of an automatic focusing apparatus having the above arrangement and performing the above signal processing will be described below. The photographing optical system 31 is driven to come close to a fixed focal length (i.e., a distance at which photographing is frequently performed) at high speed. At this time, the photosensors 51-1 to 51-n in the line sensor 32 are reset by the transfer gate 52, and charge accumulation of the photosensors 51-1 to 51-n is started. At the same time, the counter 35 is reset to count the clock pulses φO. When the peak value signal PE is not saturated upon a lapse of the unit accumulation time $t_s$ serving as a predetermined read time interval, the counter 35 is stopped upon a lapse of $t_s$. The image signal SO is output to the preamplifier 33 through the transfer gate 52. At the same time, the counter 35 is reset, and the next charge accumulation cycle is started. When the peak value signal PE exhibits a saturation value before a lapse of $t_s$, the image signal SO is immediately output, and at the same time, the counter 35 is stopped. The photosensors 51-1 to 51-n and the counter 35 are reset upon a lapse of $t_s$, and the next charge accumulation cycle is started. The image signal read from the line sensor 32 is amplified by the preamplifier 33, and a predetermined frequency component of the amplified signal is extracted by the BPF 37. The output amplitude of the extracted frequency component is converted to a positive value by the square circuit 38. The digital signal output from the A/D converter 39 is converted to a positive value divided by divider 41 by the count N output from the counter 35. As described above, the image signal is corrected to a value corresponding to the unit accumulation time. The image signals corrected in correspondence with the accumulation times are sequentially input to the integrator 42. The integrator 42 adds the image signals by the number (n) corresponding to several pixel, and obtained the focusing signal f(x) at the position x. In this manner, values at different positions which are spaced apart by Δx are obtained every $t_s$, and the focusing signal f(x) indicated by the solid curve in FIG. 9 is detected. This focusing signal f(x) is input to the filtering circuit 45, and filtering processing is performed. The S/N ratio of the focusing signal f(x) is increased by this filtering processing, and at the same time the peaks are sufficiently suppressed, thus obtaining the filtering signal g(x) indicated by a broken curve in FIG. 9. The filtering signals g(x) thus obtained are input to the microprocessor 46 and are sequentially stored in the memory 47. The in-focus position α is obtained by the above method using the filtering signal values stored in the memory 47. A control signal is output to the motor drive circuit 48 on the basis of the calculated in-focus position α to drive the pulse motor 49. As a result, the photographing optical system 31 is moved to the infocus position, thus completing focus adjustment.

According to this embodiment, since the image signal read from the line sensor 32 is divided by a count corresponding to its accumulation time, the image signal can be corrected to a value for the unit accumulation time. Even if overexposure occurs, photography can be performed without degrading the image signal, and accurate focusing signal can be obtained at several position of the photographing optical system 31.

Since the output amplitudes of a plurality of frequency components extracted by the BPF 37 are added to each other by the integrator 42, the S/N ratio of the focusing signal output can be increased.

Since the focusing signal f(x) and the spline or rect function are convoluted to perform filtering by the filtering circuit 45, a high S/N ratio of the focusing signal f(x) can be assured. More specifically, in filtering processing using the rect function shown in FIG. 4A, six focusing signals f(x) are added to obtain the filtering signal g(x) with the position x being shifted. The signal components of the filtering signal g(x) can be about a multiple of one signal f(x) of the number of added signals. The noise components can be a multiple of the square root of the number of added signals, and therefore the S/N ratio can be increased to $\sqrt{6}$ times. When considered in terms of a frequency region, a signal component is proportional to a bandwidth, and a noise component is proportional to the square root of the bandwidth. Therefore, when the spline function is used, the S/N ratio is also improved to about $\sqrt{6}$ times. Therefore, in this embodiment, a high S/N ratio can be assured, and the charges can be read every short interval. The time required for focus adjustment can be shortened. In addition, since a high S/N ratio can be assured, a detection interval X of the focusing signal f(x) can be shortened. The peaks of the focusing signal f(x) can be appropriately suppressed, and therefore focusing precision can be improved.

The in-focus position is detected by the in-focus position detecting method described above. Therefore, the in-focus position can be detected with extremely high precision.

Figure 10:
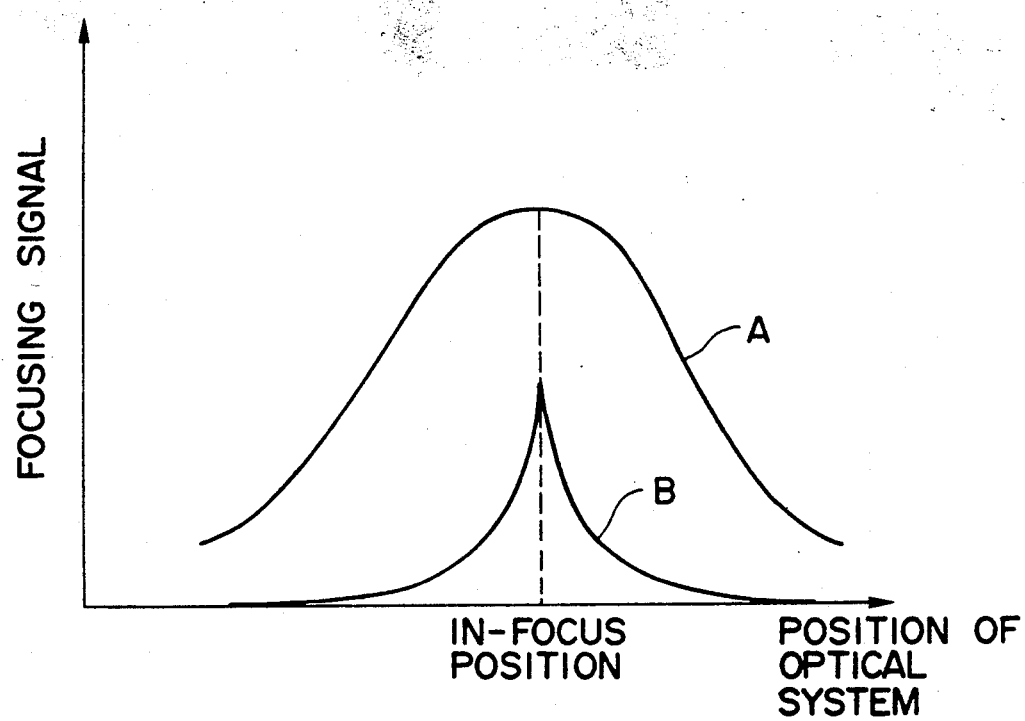
FIG. 10 is a graph for explaining a detection capacity corresponding to frequency characteristics of a bandpass filter.

In the first embodiment, only one BPF 37 is arranged to obtain a focusing signal. However, a plurality of BPFs having different center frequencies may be switched to use one. With this arrangement, the following drawback can be eliminated. When a BPF has a low center frequency, the obtained signal has a broad shape, as indicated by a curve A in FIG. 10. In this case, although the detection range of the position of the photographing optical system 31 is wide, an in-focus position cannot be accurately obtained. When a BPF has a high center frequency, the obtained focusing signal has a sharp peak at the in-focus position, as indicated by a curve B in FIG. 10. This BPF is suitable for detecting an in-focus position with high precision However, the detection range of the position of the photographing optical system is narrow.

When a defocus amount is large, the BPF is switched to a BPF having a low center frequency. When the photographing optical system is moved near the in-focus position, the BPF is switched to a BPF having a high center frequency. Alternatively, the BPFs having high and low center frequencies may be switched in accordance with a type of image, a zoom position, an f-number, and the like.

In the above embodiment, an arrangement for converting an image signal into a focusing signal is constituted by the BPF 37, the detector 38, the A/D converter 39, the divider 41, and the integrator 42, as shown in FIG. 1. However, this arrangement may be replaced with an arrangement shown in FIG. 11A. More specifically, an image signal output from the preamplifier 33 is converted by an A/D converter 61, and a digital signal from the A/D converter 61 is divided by the count N from the counter by a divider 62. This corrected image signal is input to a digital bandpass filtering circuit 63 to extract a predetermined frequency component. This frequency component is then input to a detector 64 to detect an output amplitude of the frequency component. The output amplitude is integrated by an integrator 65.

Figure 11:
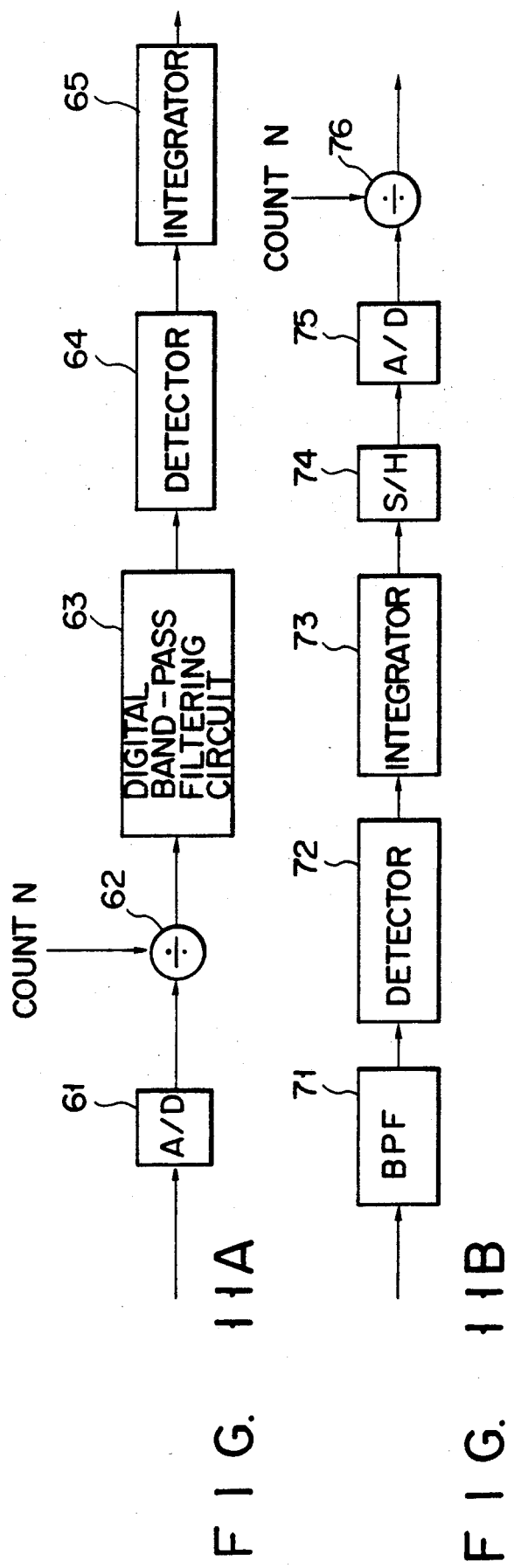
FIG. 11A is a block diagram showing an arrangement of a modification of the apparatus shown in FIG. 1.
FIG. 11B is a block diagram showing another modification of the apparatus shown in FIG. 1.

With the above arrangement, the image signal output from the preamplifier 33 is A/D-converted, and digital data can be subjected to various types of signal processing. Therefore, the dynamic range of the signal can be effectively used. As shown in FIG. 11B, the arrangement for converting an image signal into a focusing signal may be constituted by a BPF 71, a detector 72, an integrator 73, a sample/hold circuit 74, an A/D converter 75, and a divider 76. A low-pass filter may be used as the integrator 73. With this arrangement, A/D conversion can be performed at every detection interval of the focusing signal. The operating clock signal for A/D conversion can be a low clock signal, and the arrangement can be simplified, thus facilitating the manufacture of the circuit.

The output from the preamplifier 33 may be A/D-converted, and the digital signal may be processed in the microprocessor.

The second embodiment of the present invention will be described below.

Figure 12:
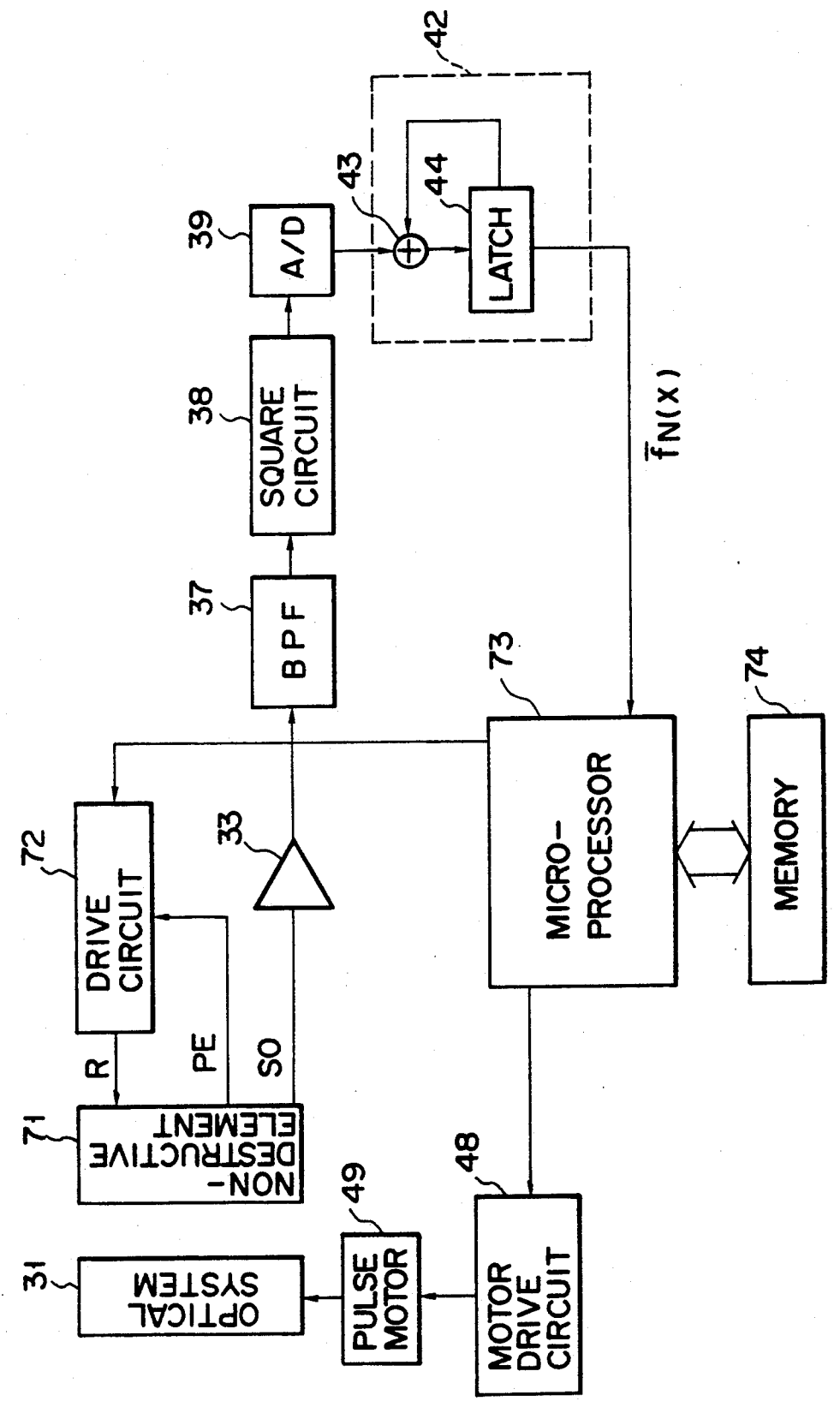
FIG. 12 is a block diagram showing an automatic focusing apparatus according to the second embodiment.

FIG. 12 is a block diagram showing an arrangement of an automatic focusing apparatus according to the second embodiment. This automatic focusing apparatus comprises a nondestructively readable image pickup element (to be referred to as a nondestructive element hereinafter) 71 such as an SIT (Static Induction Transistor), an AMI (Amplified Mos Intelligent Imager), a CMD (Charge Modulation Device), or a MOS. According to the characteristic feature of the second embodiment, an image signal read by the nondestructive element 71 is converted into a focusing signal, a difference between the focusing signals is calculated, and filtering processing is performed. The same reference numerals as in the first embodiment of FIG. 1 denote the same parts in the second embodiment of FIG. 12, and a detailed description thereof will be omitted.

An image signal read from the nondestructive element 71 is amplified by an amplifier 33, and an output amplitude of a predetermined frequency component is detected by a BPF 37 and a square circuit 38. A detection signal is input to an integrator 42 through an A/D converter 39. A focusing signal $\overline{f_N(x)}$ as an integrated value of the integrator 42 is input to a microprocessor 73. The focusing signal $\overline{f_N(x)}$ input to the microprocessor 73 is stored in a memory 74. The microprocessor 73 performs subtraction processing (to be described later) by using a positional difference in a photographing optical system 31 on an optical axis in accordance with the focusing signal $\overline{f_N(x)}$ stored in the memory 74. The microprocessor 73 performs interpolation using a filtering signal g(x) to detect an in-focus position. The microprocessor 73 outputs a control signal to a motor drive circuit 48 on the basis of this detection result. The motor drive circuit 48 drives a pulse motor 49 to move the photographing optical system 31 to perform focus adjustment.

Figure 13:
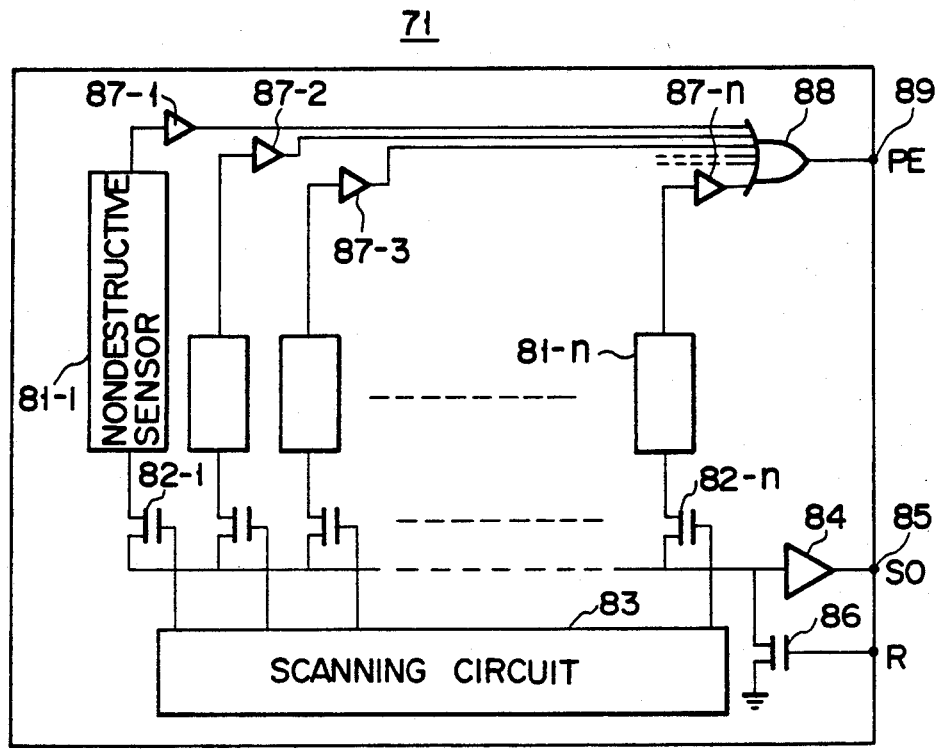
FIG. 13 is a view showing a nondestructively readable image pickup element.

FIG. 13 shows an arrangement of the nondestructive element 71. In this nondestructive element 71, nondestructive read photosensors 81-1 to 81-n aligned in an array are respectively connected to read switches 82-1 to 82-n. The read switches 82-1 to 82-n are connected to a scanning circuit 83, and image signals scanned and read by the scanning circuit 83 appear as an image signal at a terminal 85 through an output amplifier 84. Reference numeral 86 denotes a reset switch. The nondestructive photosensors 81-1 to 81-n are connected to a peak detector 88 through corresponding buffers 87-1 to 87-n. A peak value is detected by the peak detector 88 and output as a peak value signal PE from a terminal 89.

Filtering processing of the focusing signal $\overline{F_N(x)}$ based on subtraction operations using differences in positions of the photographing optical system 31 on the optical axis will be described below.

When the photographing optical system 31 is moved in a direction of the optical axis at a constant speed and charges are accumulated for time t1, the obtained image signal has an integrated value of the image signals within the moving range of the photographing optical system 31. A focusing signal obtained from the image signal has an integrated value of focusing signals within the moving range of the photographing optical system 31.

A focusing signal obtained during movement of the photographing optical system 31 from a position $X_0$ to a position $X_1$ for time t1 is defined as follows:

$$f_N(x_1) = \int_{x_0}^{x_1} f(x)dx \qquad (4)$$

Figure 14:
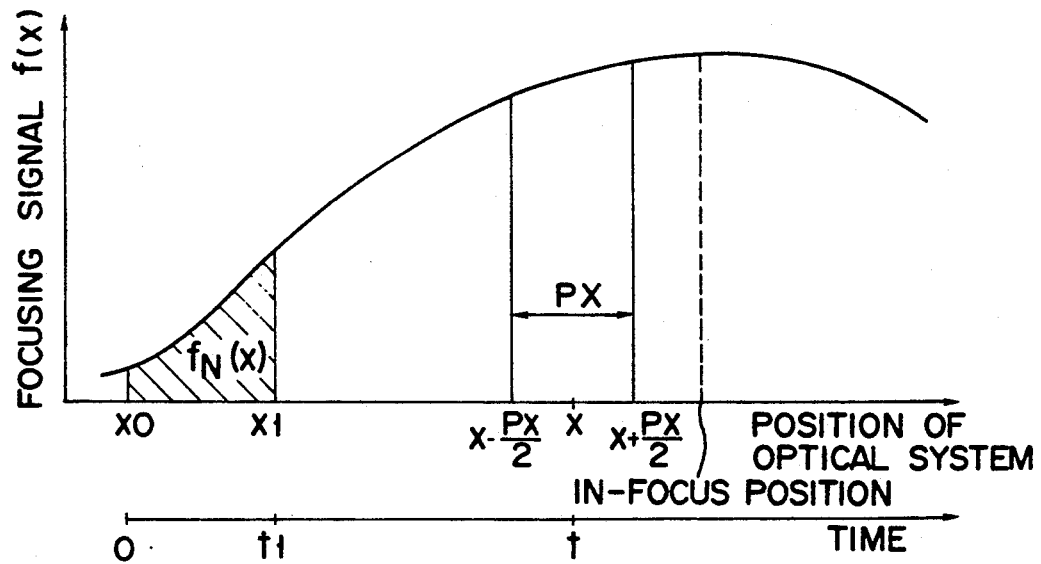
FIG. 14 is a graph showing focusing signal components to be integrated.
Figure 15:
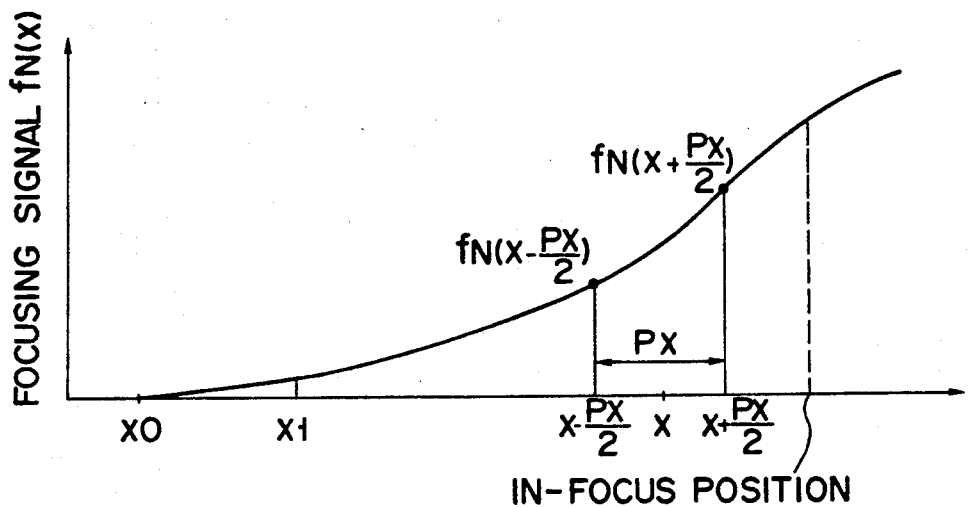
FIG. 15 is a graph showing a focusing signal $F_N(x)$ serving as an integrated value of focusing signals f(x)

The integrated value represents an area of a hatched portion in FIG. 14. $F_N(x)$ is represented as shown in FIG. 15. $f(x)$ is a differential of $F_N(x)$.

A difference between the focusing signals $F_N(x)$ (PX is a difference in positions of the photographing optical system 31 in the optical axis) is defined as follows:

$$f_N(x + Px/2) - f_N(x - Px/2) \qquad (5)$$

$$= \int_{x_0}^{x + \frac{Px}{2}} f(\xi)d\xi - \int_{x_0}^{x - \frac{Px}{2}} F(\xi)d\xi$$

$$= \int_{x - \frac{Px}{2}}^{x + \frac{Px}{2}} f(\xi)d\xi$$

$$= \int_{-\infty}^{\infty} f(\xi)\text{rect}((\xi - x)/Px)d\xi$$

$$= f(x)*\text{rect}(x/Px)$$

The focusing signals $f(x)$ at the respective positions upon movement of the photographing optical system 31 in the optical system 31 are thus filtered with the rect function.

When the nondestructive element 71 is used, filtering processing is performed by subtractions.

Figure 16:
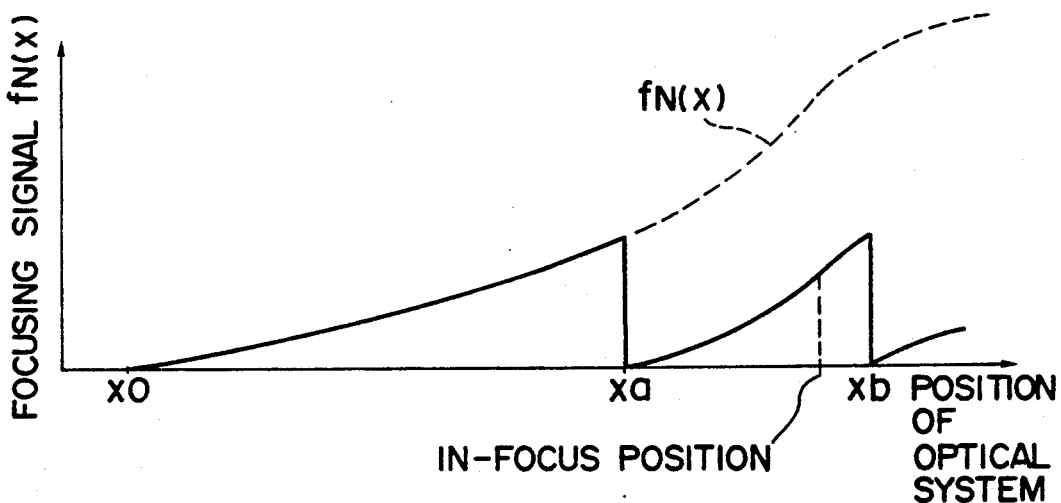
FIG. 16 is a graph showing the focusing signal $F_N(x)$ when an accumulated charge of the nondestructive image pickup element is reset.
Figure 17A:
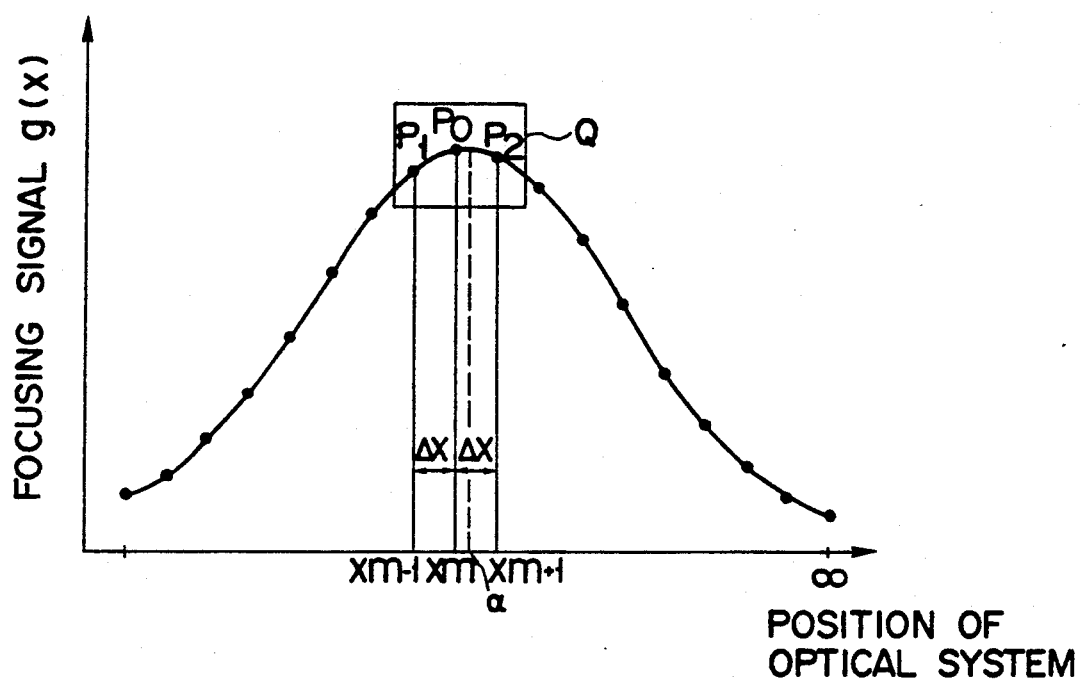
FIG. 17A is a graph for explaining an interpolation operation for detecting an in-focus position.
Figure 17B:
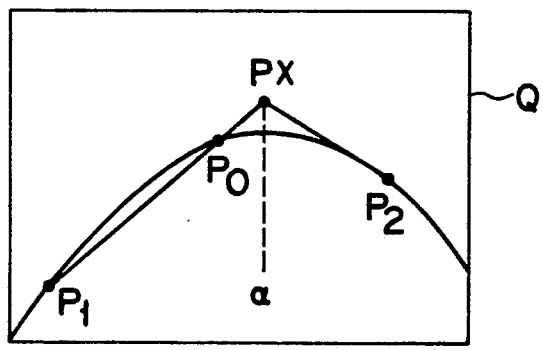
FIG. 17B is a graph showing only a peak portion of a focusing signal g(x) shown in FIG. 17A.

Since the nondestructive element 71 is saturated in practice, the accumulated charges of the nondestructive element 71 are reset at the time of saturation of the peak value signal PE. For this reason, the focusing signal $F_N(x)$ shown in FIG. 15 changes, as indicated by the solid curve in FIG. 16. More specifically, FIG. 16 shows resetting of the element when the photographing optical system 31 is located at positions Xa and Xb in the direction of the optical axis. That is, when $Xa < X < Xb$
$\overline{f_N(x)} = f_N(x) + \overline{f_N(xa)}$
when $Xb < X$ -continued
$\overline{f_N(x)} = f_N(x) + \overline{f_N(xa)} + \overline{f_N(xb)}$ The in-focus position is obtained by interpolating a plurality of points near a maximum value of a focusing signal curve. In-focus position detection will be described with reference to FIGS. 17A and 17B. FIG. 17A shows a focusing signal. The position of the photographing optical system 31 moving in the direction of the optical axis is plotted along the abscissa, and the signal level of the focusing signal $g(x)$ is plotted along the ordinate. Assume that the focusing signal values at a point P0 corresponding to the maximum value of the focusing signal and points P1 and P2 immediately preceding and succeeding the point P0 are given as $g(X_m)$, $g(X_{m-1})$, and $g(X_{m+1})$, respectively.

If $g(x_{m-1}) \leq g(x_{m+1})$, an x-coordinate $\alpha$ of an intersection $P_x$ between a line obtained by connecting the points $P_0$ and $P_1$ and having a gradient, a sign of which is opposite to that of a line passing through the point $P_2$ serves as an in-focus position. The coordinate can be obtained by the following geometric relationship:

$$\alpha = Xm + \qquad (II)$$
$$\Delta X/2[\{g(Xm+1) - g(Xm-1)\}/\{g(X_m) - g(X_{m-1})\}]$$

If $g(X_{m-1}) > g(X_{m+1})$, then the coordinate $\alpha$ is given as follows:

$$\alpha = X_m - \Delta X/2[\{g(X_{m-1}) - g(X_{m+1})\}/\{g(X_m) - g(X_{m+1})\}] \qquad (III)$$

An operation of this embodiment will be described below.

Figure 18:
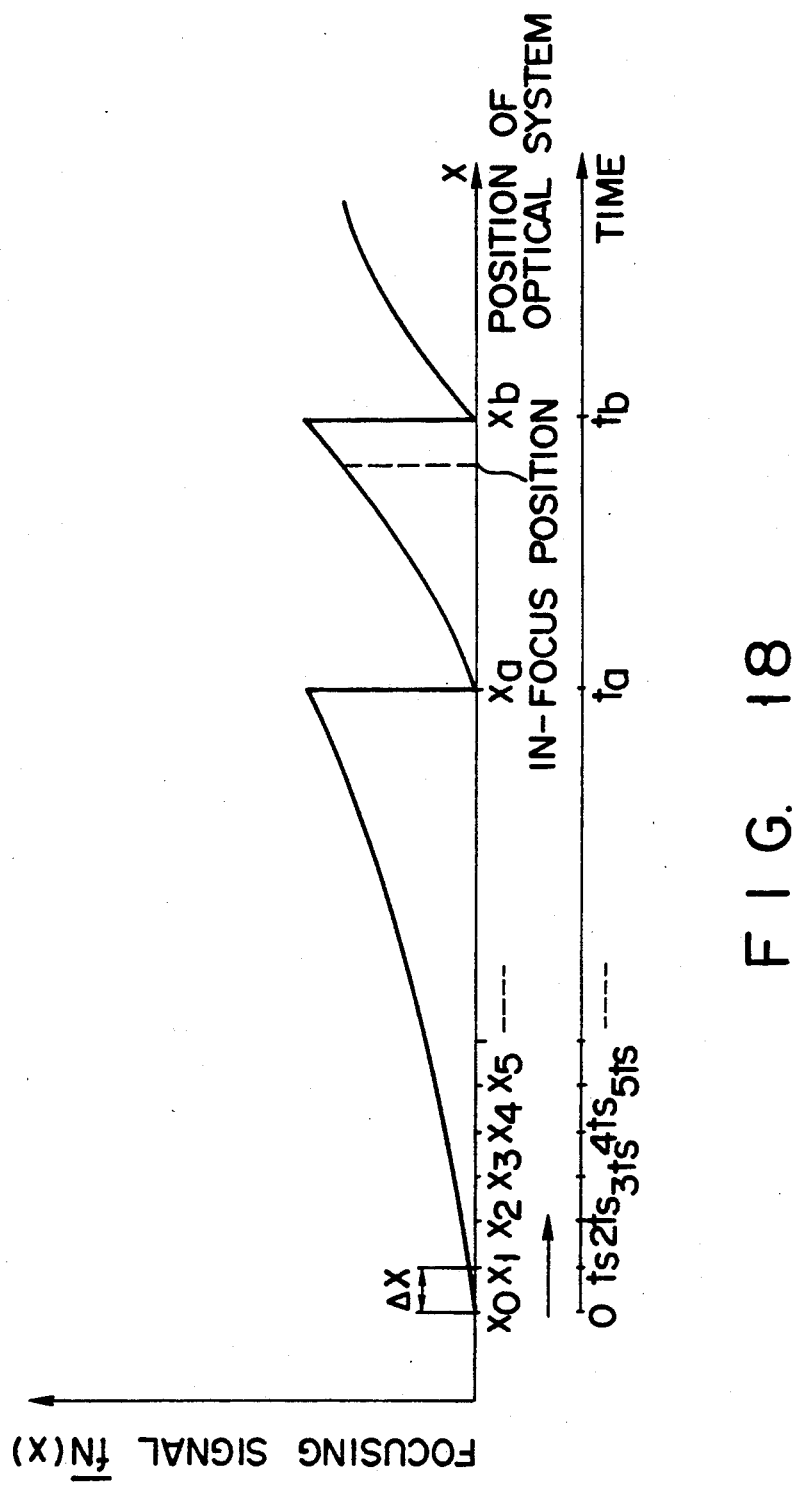
FIG. 18 is a graph showing a focusing signal read at a predetermined timing.

The nondestructive element 71 is set to start charge accumulation. The read switches 82-1 to 82-n are scanned every time ts to read the accumulated charges from the nondestructive photosensors 81-1 to 81-n as an image signal. The read image signal is amplified by the preamplifier 33, and the predetermined frequency component is extracted by the BPF 37. A negative value of the frequency component is converted by the square circuit 38 and is A/D-converted. The digital signal from the A/D converter is input to the integrator 42. The integrator 42 adds n A/D-converted outputs corresponding to the n image signals to generate the focusing signal $\overline{F_N(x)}$. On the other hand, when the value of the peak signal PE output from the nondestructive element 71 reaches a saturation point, a reset signal is output from a drive circuit 72 to reset the nondestructive element 71. The focusing signal $\overline{F_N(x)}$ shown in FIG. 18 is stored in the memory 74. Times ta and tb shown in FIG. 18 represent times at which the peak signal reaches the saturation point. Positions Xa and Xb of the photographing optical system 31 at these times are also stored in the memory 74. The focusing signal $\overline{F_N(x)}$ stored in the memory 74 is filtered with the rect function, thereby obtaining the filtering signal $g(x)$ for subtraction, and unnecessary components are eliminated.

The subtraction operation for obtaining the filtered focusing signal $g(x)$ is given as follows when a difference in position of the photographing optical system 31 on the optical axis is given as d.

$$g(x) = f_N(X+d/2) - f_N(X-d/2) \qquad (8)$$

In this case $F_N(x)$ is defined as follows:

$$\begin{array}{ll} X < Xa & \overline{f_N(x)} \\ Xa < X \leq Xb & \overline{f_N(x)} + \overline{f_N(xa)} \\ Xb < X & \overline{f_N(x)} + \overline{f_N(xa)} + \overline{f_N(xb)} \end{array} \quad (9)$$

The obtained filtering signals g(x) are given as V1, V2, and V3 from the latest one, and the microprocessor 73 determines a focusing state from these three values and controls and drives the pulse motor 49. If V1>V2>V3 (i.e., if a focusing signal is increased), the microprocessor 73 outputs a control signal for driving the photographing optical system 31 without reversing the driving direction. However, when condition V1<V2<V3 (i.e., if a focusing signal is decreased,) is established, the microprocessor 73 outputs a control signal for reversing the driving direction. If a focusing signal V1 is<V2 and V3<V2, the microprocessor 73 determines that the V2 is the nearest filtering signal at in-focus position. The microprocessor 73 then performs an in-focus position calculation by interpolation.

This interpolation is performed by substituting $g(X_{m-1})=V3$, $g(X_m)=V2$, and $g(X_{m+1})=V1$ into equations (II) and (III).

The microprocessor 73 determines a driving amount to drive the photographing optical system 31 to the in-focus position in accordance with the obtained in-focus position, and the current position of the photographing optical system 31 which is obtained by the pulse count during driving of the pulse motor 49.

According to the second embodiment, high-speed, high-precision focus adjustment can be performed as in the first embodiment. In addition, since the non-destructively readable image pickup element 71 is used, the subtraction of the focusing signals FN(x) can be obtained to obtain the focusing signal g(x) filtered by the rect function. As a result, the filtering circuit 45 used in the first embodiment can be omitted, and the apparatus can be made compact.

In the second embodiment, when the values V1, V2, and V3 (V1<V2 and V3<V2) of the filtering signals are detected, the driving direction of the photographing optical system 31 is reversed to reduce the driving speed without immediately performing the interpolation, thereby performing focus adjustment. In this case, the S/N ratio of the focusing signals can be improved, and detection precision can be further improved.

Figure 19:
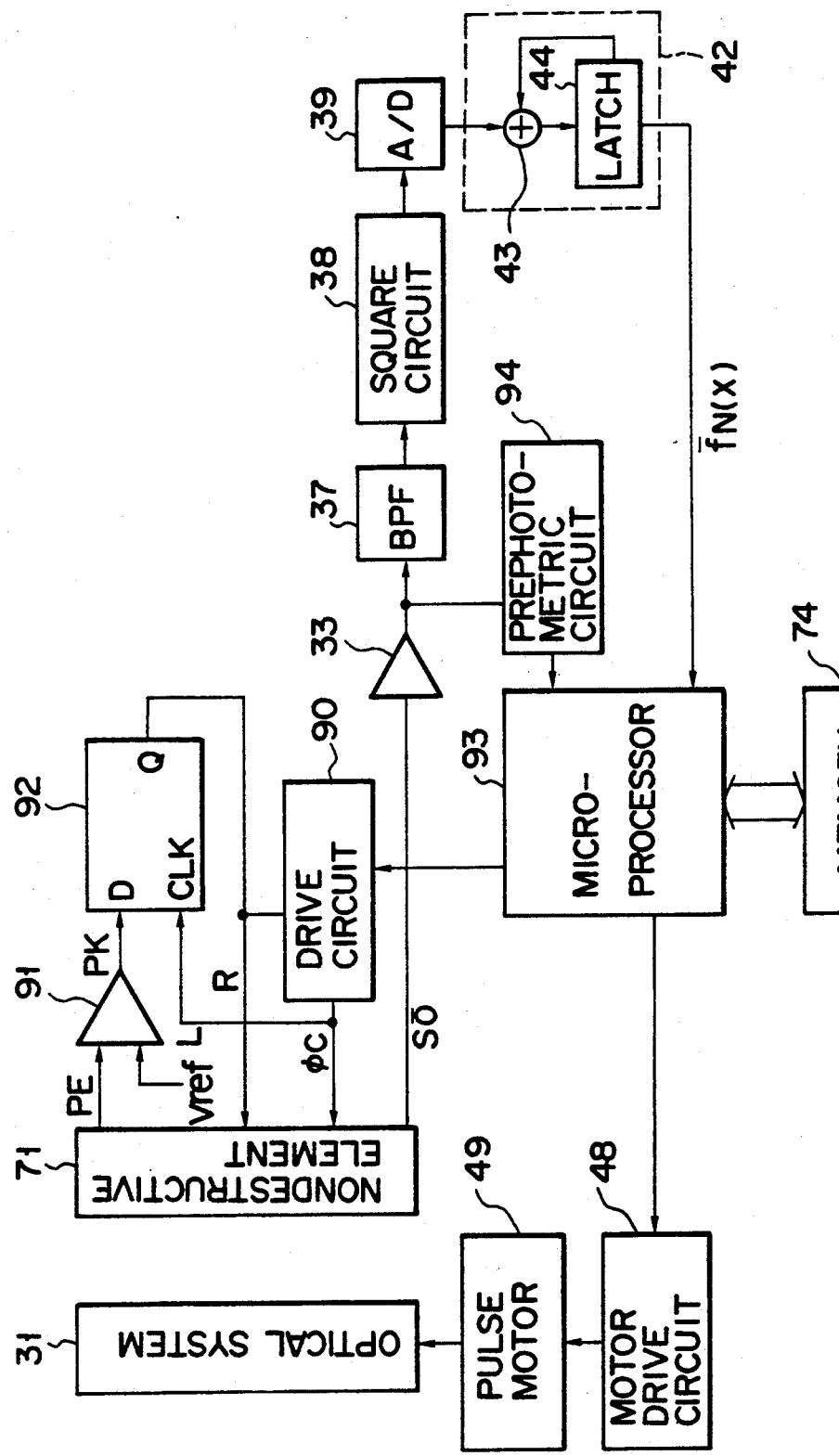
FIG. 19 is a block diagram showing an automatic focusing apparatus according to the third embodiment of the present invention.

The third embodiment of the present invention will be described below. An arrangement of an automatic focusing apparatus according to the third embodiment of the present invention is shown in FIG. 19. The same reference numerals as in the first or second embodiment denote the same parts in the third embodiment, and a detailed description thereof will be omitted. The third embodiment exemplifies a read time interval of a nondestructive element 71 by measuring a luminance of an image formed by a photographing optical system 31. The nondestructive element 71 is driven by a read clock signal $\phi c$ transmitted from a drive circuit 90. A peak signal PE of the accumulated charge of the nondestructive element 71 is input to a D flip-flop circuit 92 through a comparator 91. The comparator 91 has a threshold value Vref slightly smaller than the peak value (saturation level) of the accumulated charge of the nondestructive element 71. When a peak signal PE having a value larger than the threshold value Vref is input to the comparator 91, the comparator 91 outputs an "H" (high level) output PK to the D flip-flop circuit 92. The D flip-flop circuit 92 receives the signal PK from the comparator 91 as its D input and the read clock $\phi c$ from the drive circuit 90 as its CLK input. When the D input is set at H level and a CLK input is supplied to the D flip-flop circuit 92, its Q output becomes 'H' (high level). And when the next CLK input is supplied to the D flip-flop circuit 92, its Q output becomes "L" (low level). The Q output from the D flip-flop circuit 92 is output to the nondestructive element 71 as a reset signal when the nondestructive element 71 is set at H. A timing of the read clock signal $\phi c$ output from the drive circuit 90 is set by a microprocessor 93. The image signal read from the nondestructive element 71 is input to an amplifier 33. A BPF 37 and a prephotometric circuit 94 are connected in parallel with each other to the output terminal of the amplifier 33. The prephotometric circuit 94 measures a luminance of an image formed on the non-destructive element 71 by using the input image signal and outputs the measurement result to the microprocessor 93. An arrangement for obtaining a focusing signal $\overline{f_N(x)}$ through a square circuit 38, an A/D converter 39, and an integrator 42 by using the image signal output from the BPF 37 is the same as that of the second embodiment.

An operation of the third embodiment will be described below.

The luminance of the image is measured by the prephotometric circuit 94. This measurement continues during a time interval tv from the start of photographing until the D input to the D flip-flop circuit 92 becomes "H". That is, the prephotometric measurement continues until the peak value PE of the nondestructive element 71 exceeds the threshold value Vref.

At the time, if the time interval tv is shorter than the unit accumulation time $t_s$ described in the first embodiment, the object is sufficiently bright. When the object is exposed for the unit accumulation time $t_s$, the nondestructive element 71 is saturated. This mode is called a saturation mode hereinafter.

A unit accumulation time $t_s'$ satisfying condition $t_s' < tv$ is set by the microprocessor 93 on the basis of the prephotometric data sent from the prephotometric circuit 94. The nondestructive element 71 is reset every unit accumulation time $t_s'$ to read an image signal SO.

When the time interval tv is longer than the unit accumulation time $t_s$, the object is dark. The nondestructive element 71 is not saturated by exposure within the unit accumulation time $t_s$. This mode is called a nonsaturation mode hereinafter.

Figure 20:
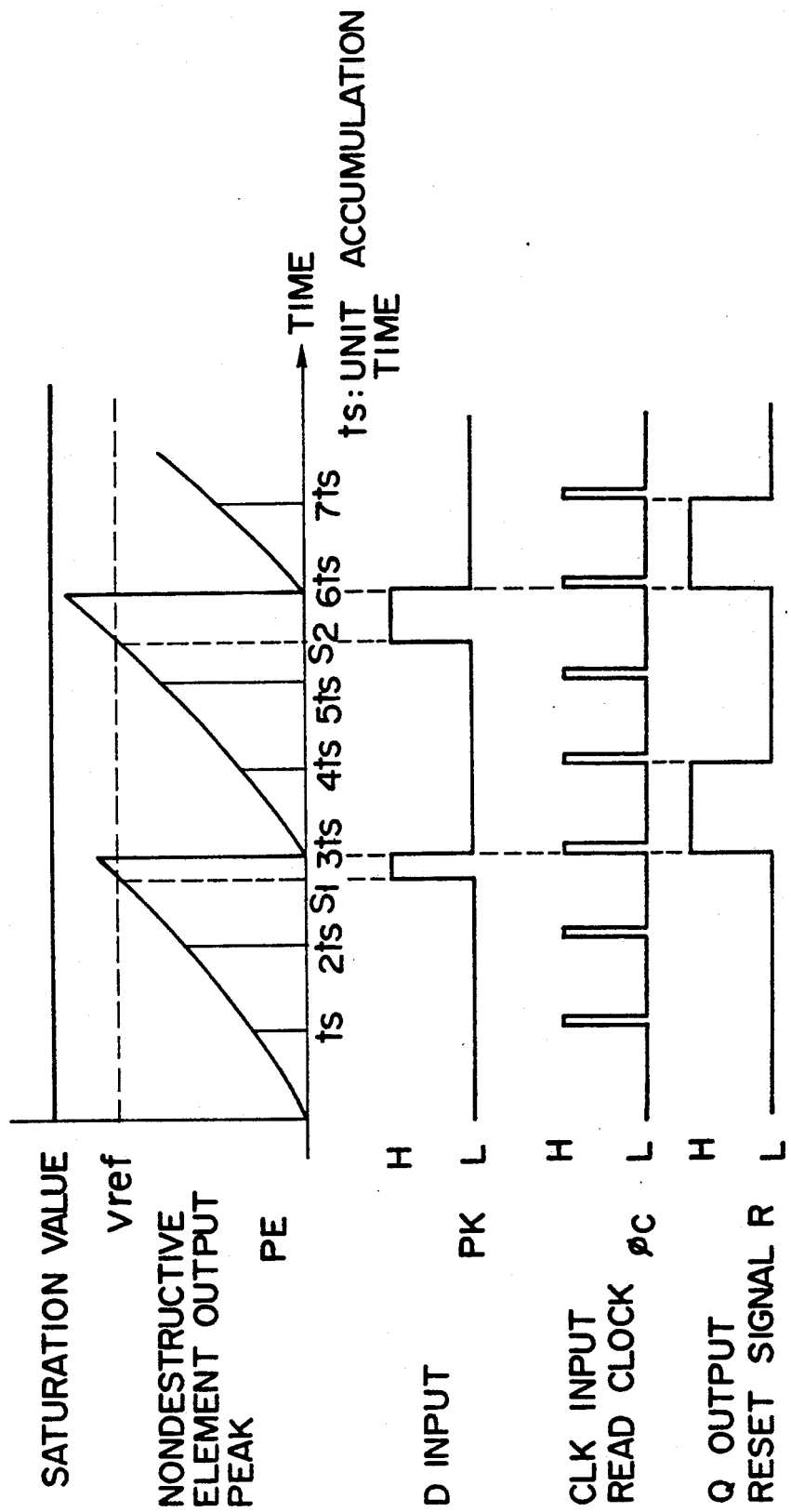
FIG. 20 is a timing chart for reading the accumulated charge from the nondestructive element.

FIG. 20 is a timing chart showing a resetting operation in a nonsaturation mode. FIG. 20 shows a peak signal PK representing a charge accumulation state of the nondestructive element 71, a peak signal PE input to the D input of the D flip-flop circuit 92, the read clock signal $\phi c$ output from the drive circuit 90 every $t_s$,and serving as a CLK input of the D flip-flop circuit 92, and the reset signal R as the Q output from the D flip-flop circuit 92.

When an image pickup operation of the nondestructive element 71 is started, an image signal is read every unit accumulation time $t_s$. When the charge is accumulated by the nondestructive element 71 and the output level of the peak signal PE exceeds the threshold value Vref at time $S_1$, the D input goes to H level. The Q output goes to H level by the read clock $\phi c$ output after the D input goes to H level, and the nondestructive element 71 is reset. The Q output goes to L level by the next read clock $\phi c$ at time $4t_s$. When the output level of the peak signal PE exceeds the threshold valve Vref at time $S_2$ again, a similar resetting operation is started.

In this embodiment, the luminance of the image is measured by the prephotometric circuit 94. In the saturation mode, the unit accumulation time $t_s$, satisfying condition $t_s' < tv$ is set, and the non-destructive element 71 is reset every unit accumulation time $t_s'$. The image signal SO is then read. In the nonsaturation mode, the unit accumulation time serving as the output timings of the read clock signal $\phi c$ is set on the basis of the luminance data. At the same time, the threshold value Vref which is slightly lower than the saturation level with respect to the peak signal PE representing the charge accumulation state of the nondestructive element 71 is set. When the output level of the peak signal PE exceeds the threshold value, the nondestructive element 71 is reset in response to the read clock signal $\phi c$ output at the next timing. Therefore, the saturation of the nondestructive element 71 and degradation of the image signal can be prevented, and high-precision focus adjustment can be performed regardless of luminance levels of the objects.

In the third embodiment, the focusing signals $\overline{f_N(x)}$ are not filtered in the saturation mode. However, the focusing signal may be filtered by a microprocessor 93.

The fourth embodiment of the present invention will be described below.

Figure 21:
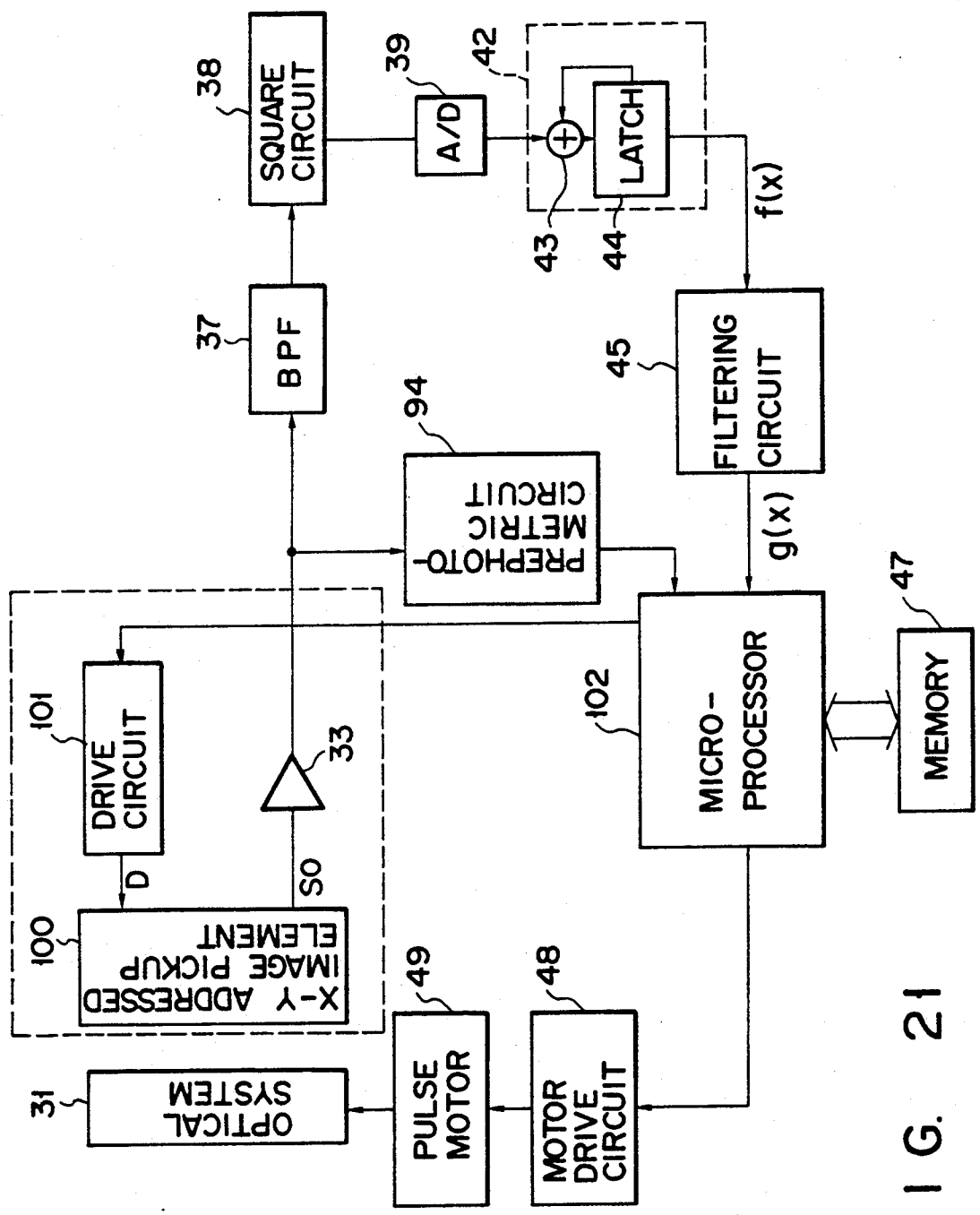
FIG. 21 is a block diagram showing an automatic focusing apparatus according to the fourth embodiment of the present invention.

FIG. 21 is a block diagram showing an arrangement of an automatic focusing apparatus according to the fourth embodiment. The same reference numerals as in the first to third embodiments denote the same parts in the fourth embodiment, and a detailed description thereof will be omitted.

This embodiment exemplifies focus adjustment of an arbitrary area of an image by using an area sensor.

Referring to FIG. 21, reference numeral 100 denotes an area sensor which comprises an X-Y addressed image pickup element such as a MOS, SIT, or CMD element. The area sensor 100 is driven by a drive signal D output from a drive circuit 101, and an image signal of a predetermined area is read. A prephotometric circuit 94 receives the image signal read from the area sensor 100 and measures a luminance of an image from the input image signal. The luminance signal is output to a microprocessor 102. The microprocessor 102 has a function of setting an accumulation time so as to prevent a predetermined area of the area sensor 100 from being saturated on the basis of the input luminance signal, a function of designating a read area of the area sensor 100, and a function of executing in-focus position detection from the filtering signals g(x).

Figure 22:
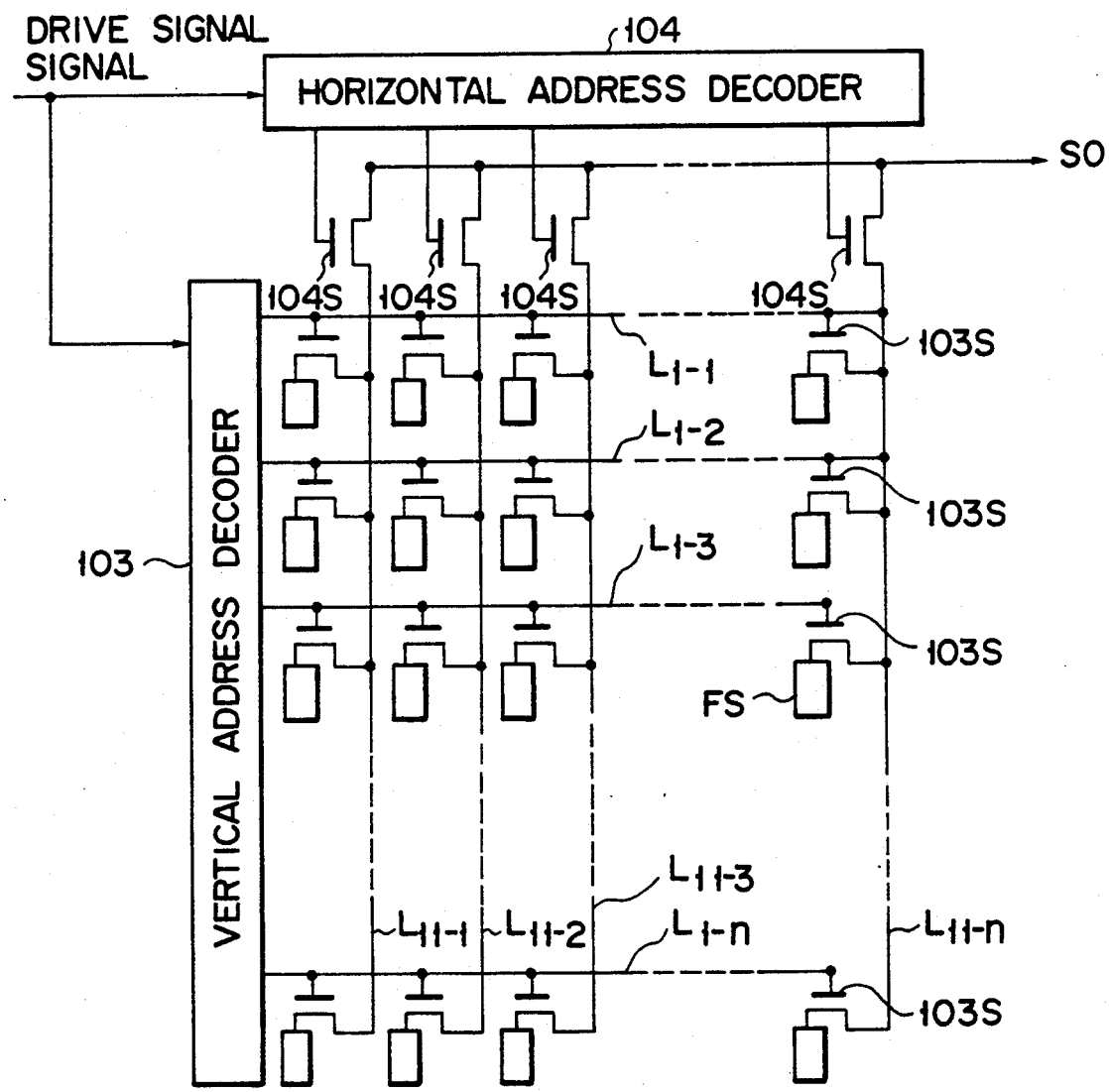
FIG. 22 is a view showing a detailed arrangement of an area sensor.

FIG. 22 is a view showing an arrangement of the area sensor 100. The area sensor 100 has a plurality of photosensors FS arranged in a matrix form. The photosensors FS are respectively connected to a plurality of horizontal signal lines $L_{I-1}$ to $L_{I-N}$, each of which has one end connected to a vertical address decoder 103, and vertical address switches 103S. The photosensors FS are respectively connected through horizontal address switches 104S to a plurality of vertical signal lines $L_{II-1}$ to $L_{II-N}'$ each of which has one end connected to a horizontal address decoder 104.

In the area sensor 100 having the above arrangement, a predetermined one of the horizontal signal lines $L_{I-1}$ to $L_{I-N}$ is selected by the vertical address decoder 103, and a predetermined one of the vertical signal lines $L_{II-1}$ to $L_{II-N}$ is selected by the horizontal address decoder 104 to simultaneously turn on the horizontal and vertical address switches 103S and 104S connected to the corresponding lines, thereby reading accumulated charges from the plurality of photosensors FS of the selected area as an image signal SO. A read area is addressed by drive signals D input to the vertical and horizontal address decoders 103 and 104, and therefore an image signal of an image of an arbitrary area can be read.

Figure 23:
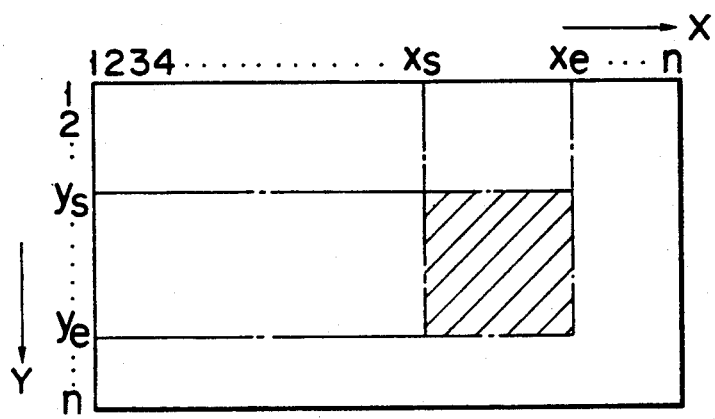
FIG. 23 is a view showing a read area of the area sensor.

An operation of this embodiment will be described with reference to FIG. 23. The horizontal direction of the area sensor 100 shown in FIG. 22 is defined as an X-axis (X=1, 2, ... n), and the vertical direction is defined as a Y-axis (Y=1, 2, ... n). A hatched portion in FIG. 23 is exemplified as an area subjected to focus adjustment.

A prephotometric operation of the hatched portion is performed.

The microprocessor 102 outputs address designation data for the hatched areas ((Xs,Ys)−(Xe,Ye)) to the drive circuit 101. The drive circuit 101 outputs a drive signal D for designating addresses (Ys−Ye) to the vertical address decoder 103 and a drive signal D for designating addresses (Xs−Xe) to the horizontal address decoder 104. For example, the charges accumulated for a predetermined time interval tp are sequentially read out as image signals from the photosensors FS of the hatched area. The prephotometric circuit 94 measures a luminance of an image from the read image signals and outputs the luminance data to the microprocessor 102. The microprocessor 102 sets a unit accumulation time $t_s$ on the basis of the luminance data. That is, when the peak value of the charge accumulated by the photosensor FS is not saturated and exceeds a threshold value as a 70% value of the saturation value, the accumulation time interval tp is defined as the unit accumulation time $t_s$.

When the peak value is saturated, the charge accumulation time is continuously shortened to repeat luminance discrimination, thereby detecting an accumulation time tpp for which the peak value is not saturated. The detected accumulation time tpp is set as the unit accumulation time $t_s$.

When the peak value does not reach the threshold value Vref, the charge accumulation time is continuously prolonged to repeat luminance discrimination, thereby detecting an accumulation time tppp after which the peak value exceeds the threshold value Vref. The detected accumulation time tppp is set as the unit accumulation time $t_s$.

By the above prephotometric operations, the unit accumulation time $t_s$ which does not cause degradation of the image signal can be set in accordance with the luminance of the hatched area.

An image signal SO of the hatched area is read every accumulation time $t_s$. A read order of the image signals SO from the hatched area is determined as follows.

X-Axis Sequential Read Scheme

This read operation starts from read access in the X-axis. Image signals are read in an order of Y=Ys row (i.e., $(X_s, Y_s), (X_{s+1}, Y_s)$, ... $(X_e, Y_s)$, and then $Y=Y_{s+1}$ row, Y2+2 row, ..., $Y_e$ row.

Y-Axis Sequential Read Scheme

This read operation starts from read access in the Y-axis. Image signals are read in an order of X=Xs column $((X_s, Y_s), (X_s, Y_{s+1}), ..., (X_s, Y_e))$ and then X=Xs°1 column, Xs+2 column, ..., Xe column.

Oblique-Direction Sequential Read Scheme

This read operation starts from read access in an oblique direction. More specifically, the read operation starts from $(X_s, Y_s)$, and sequentially read charges of pixels $(X_i, Y_i)$ satisfying $Y_i = -X_i + (X_s + Y_s + K)$ according to hatched in FIG. 23.

The above three read schemes are selectively used in accordance with the type of object. For example, the Y-axis sequential read scheme is used for an object having horizontal stripes. When an object has vertical stripes, the X-axis sequential read scheme is employed. Each read scheme is selected at the time of prephotometric operation.

The charge accumulation time $t_s$ and the read order are thus determined.

Figure 24A:
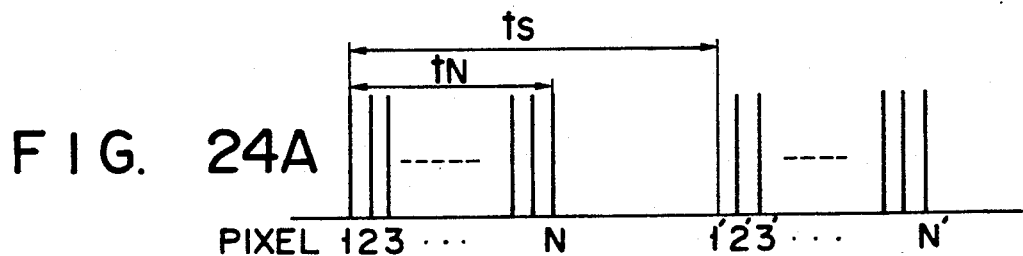
FIG. 24A is a view showing a relationship between read clock pulses and pixels when the unit accumulation time is longer than a period required for reading charges from all pixels.
Figure 24B:
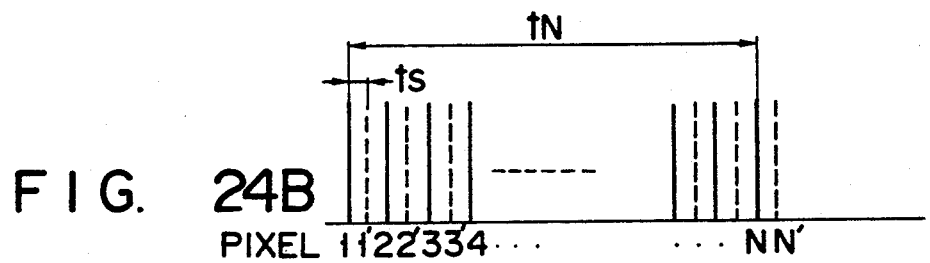
FIG. 24B is a view showing a relationship between read clock pulses and pixels when charges of the same pixel are read by two continuous clock pulses.
Figure 24C:
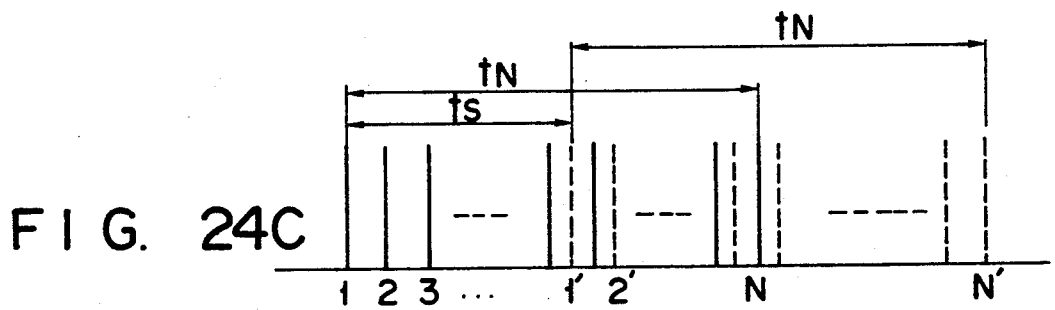
FIG. 24C is a view showing a relationship between read clock pulses and pixels when the unit accumulation time is shorter than a period required to read charges from all pixels.

A relationship between the read clock signal supplied to the area sensor 100 and the charge accumulation time of the area sensor 100 will be described with reference to FIG. 24. FIGS. 24A to 24C show read clock signals and pixels (photosensors FS) read at that time. 1 to N (N=m×n) correspond to pixel positions, and 1' to N' represent next read positions. If the time interval of the read clock signal is given as tc, a time tN required for reading charges of all the pixels is given as tN=N.tc.

When the unit accumulation time ts is longer than the time tN (FIG. 24A), the charges can be read without any problem.

The same pixel is accessed in response to two continuous clock pulses (or clock pulses having an appropriate interval). In this case, even if $t_s < tN$ (tN is twice the time interval in FIG. 24A) as a brigthness is high, read access can be performed. The minimum time interval of $t_s$ becomes the clock time interval tc (FIGS. 24B and 24C). In order to shorten the read time, a plurality of horizontal address decoders and a plurality of vertical address decoders are arranged and alternately operated. In addition, multi-line read access may be utilized to increase a read speed, and charges of the neighboring pixels may be added to increase an S/N ratio. Although integration times of the respective pixels are different since all the pixels are sequentially read-accessed (the integration of the optical position are identical as $t_s$), the focusing signals are averaged in the direction of the optical axis, and no problem is posed.

The image signal read as described above is input to the BPF 37 as a one-dimensional signal and is processed in the same manner as in the first embodiment, thereby performing focus adjustment.

According to this embodiment, since an image is picked up by using the area sensor 100, high-speed focus adjustment of an arbitrary area of an image can be performed with high precision.

The fourth embodiment exemplifies an operation for causing the prephotometric circuit 94 to select an image signal read scheme. It is possible to arrange a circuit for discriminating the type of object.

Figure 25:
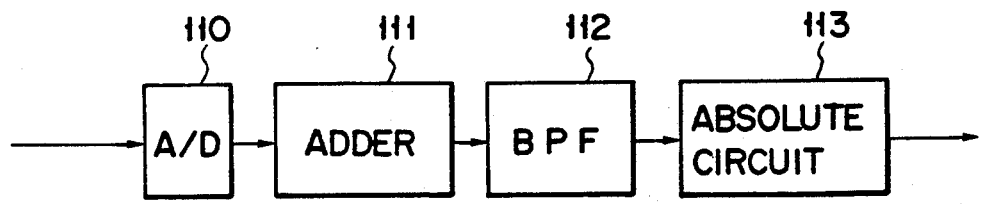
FIG. 25 is a block diagram showing a partial modification of the apparatus shown in FIG. 21.

In X- and Y-axis sequential read schemes, image signals are added in units of rows and columns, respectively. With this arrangement, an S/N ratio of the signal can be further improved In order to add the signals, a path of the BPF 37 to the A/D converter 39 in FIG. 21 is connected to in series with an A/D converter 110, an adder 111, a BPF 112, and an absolute circuit 113, as shown in FIG. 25.

In the fourth embodiment described above, the BPF 37 is a filter circuit for one-dimensional signals (image signals) but may be a two-dimensional filter circuit such as a mask processor including a buffer.

The fifth embodiment of the present invention will be described below.

FIG. 26 is a block diagram showing an arrangement of the fifth embodiment. The same reference numerals as in the first to fourth embodiments denote the same parts in the fifth embodiment. The fifth embodiment uses a CCD two-dimensional image pickup element as an area sensor used in the third embodiment.

Referring to FIG. 26, reference numeral 120 denotes a CCD two-dimensional image pickup element which receives a transfer gate drive pulse $\phi T$, a vertical clock pulse $\phi V$, a horizontal clock pulse $\phi H$, and output gate drive pulses $\phi 01$ and $\phi 02$ from a drive circuit 121. A microprocessor 122 has the same function as that of the microprocessor described in the fourth embodiment and has a function of setting the above pulses output from the drive circuit 121.

FIG. 27 is a view showing an arrangement of the CCD two-dimensional image pickup element 120. The CCD two-dimensional image pickup element 120 has m×n pixels. Photosensors 131 serving as pixels are arranged in a matrix form. Transfer gates 132-11 to 132-17 are arranged along the plurality of photosensors 131-11 to 131-17, ... 131-ml to 131-mn arranged in the direction of the Y-axis. The transfer gate drive pulses $\phi T$ are input to the transfer gates 132, respectively. Vertical shift registers 133-1 to 133-m are arranged along the transfer gates 132-1 to 132-m. The vertical clock pulses $\phi V$ are input to the vertical shift registers 133, respectively. One terminal of each transfer gate 132 and one terminal of each vertical shift register 133 are connected to a horizontal shift register 134. The horizontal clock pulse $\phi H$ is input to the horizontal shift register 134. A signal charge transferred to the horizontal shift register 134 is extracted through an output gate 135 formed along the horizontal shift register 134 and an output gate 136 arranged at one terminal of the horizontal shift register 134. Reference numerals 137, 138, and 139 denote output drains, respectively. A signal charge extracted through the output drain 139 is output as an image signal SO through an output amplifier 140. The output gate drive pulses $\phi 01$ and $\phi 02$ are input to the output gates 135 and 136, respectively.

Focus adjustment of photosensors (X=X1 to X2 and Y=Y1 to Y2) of a hatched area shown in FIG. 27 will be described as an operation of the fifth embodiment.

When charge accumulation is completed, the charges of the photosensors 131-11 to 131-mn are transferred to the vertical shift registers 133-11 to 133-m through the transfer gates 132-1 to 132-m, and are then transferred to the horizontal shift register 134 by the vertical shift register 133 at high speed. The signal charges transferred to the horizontal shift register 134 are discharged to the output drain 137 through the output gate 135.

The above read operation is repeated for signal charges of all pixels of the Y=n to $Y_2+1$ rows. High-speed transfer of the vertical shift register 133 is performed at a speed which does not impair the signal charges read from the photosensors. When the signal charge of the $Y=Y_2$ row is transferred to the horizontal shift register 134, high-speed transfer is stopped, and a normal signal read operation is performed. The signal charges except for those of $X=X_1$ to $X_2$ are discharged to the output drain 138 through the output gate 136.

When signal charge read access of the pixels of the rectangular area is completed, high-speed transfer is started again, and the signal charges are discharges from the pixels of the $Y = Y_1 - 1$ to $Y_1$ row are discharged to the output drain 137.

The image signals of the rectangular area shown in FIG. 27 are read at high speed by the above operations. The charge accumulation time by the above read operations is a period required for transferring the charges to the vertical shift register 133. This period serves as the unit accumulation time $t_s$. The unit accumulation time $t_s$ is determined on the basis of the luminance data measured by the prephotometric circuit 94 in the same manner as in the fourth embodiment. The signal charge of the rectangular area is read every unit accumulation time and is input to the BPF 37. The subsequent operations are the same as those in the first embodiment. That is, a focusing signal $g(x)$ and a filtering signal $f_N(x)$ are calculated, and focus adjustment is performed.

According to this embodiment, the CCD two-dimensional image pickup element 120 is used to perform high-speed focus adjustment of an arbitrary area of an image with high precision.

When the image signals read from the CCD two-dimensional image pickup element 120 are added in units of columns or rows, an S/N ratio of the result signal can be increased, and more precise focus adjustment can be achieved.

An automatic focusing apparatus for performing an improved interpolation operation will be described according to the sixth embodiment of the present invention.

As described with reference to the second embodiment, a maximum value and signal values preceding and succeeding the maximum value of the focusing signal are used to obtain an in-focus position from equations (II) and (III). In equations (II) and (III), $\Delta x$ represents an interval between adjacent ones of the three values, and this interval is called an interpolation interval. The interpolation interval $\Delta x$ directly influences the focusing precision, and an optimal interpolation interval $\Delta x$ must be selected.

Since the interpolation operation using the above three values includes an error, this error must be corrected. In this embodiment, an optimal interval is detected, and an interpolation error is then corrected.

First detection of an optimal interpolation interval will be described below.

Figure 28:
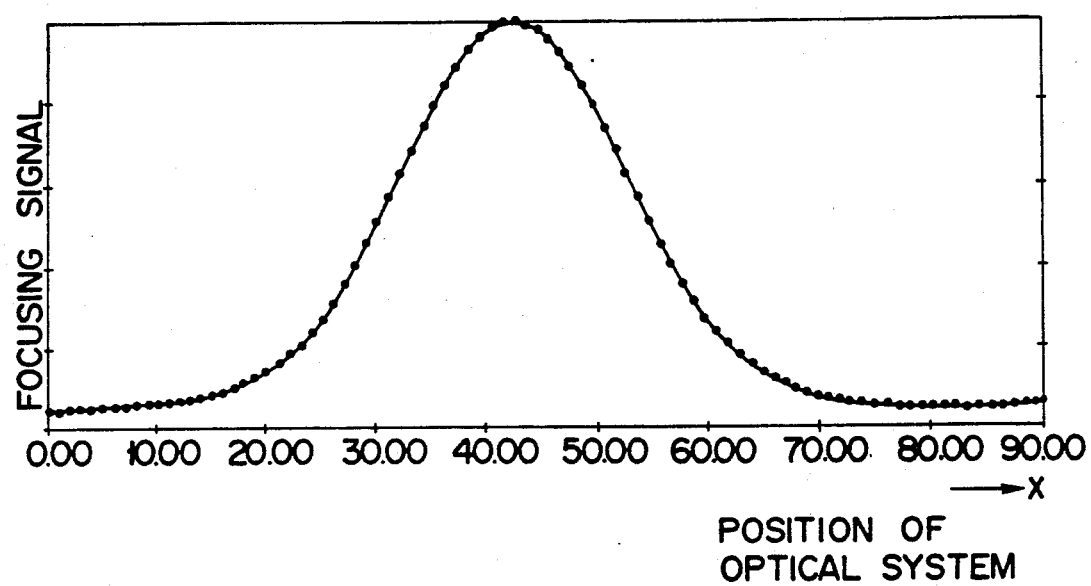
FIG. 28 is a waveform chart obtained when the focusing signal is represented by a Gaussian curve.
Figures 30A, 30B, 30C:
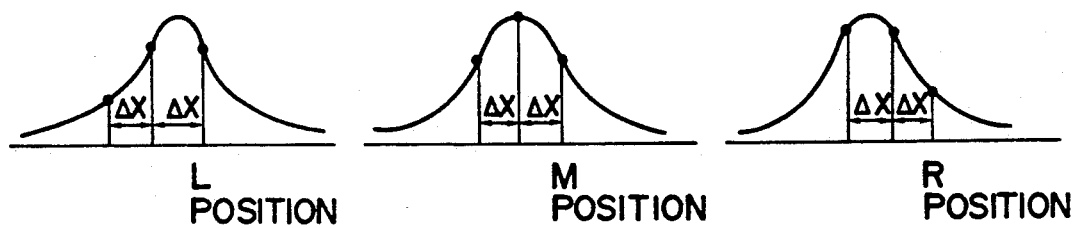
FIG. 30A is a graph showing a position of the photographing optical system when two right points out of the three points at an interpolation position have identical focusing signal.
FIG. 30B is a graph showing a position of the photographing optical system when two end points out of the three points have identical focusing signal.
FIG. 30C is a graph showing a position of the photographing optical system when two left points out of the three points have identical focusing signal.
Figure 29A:
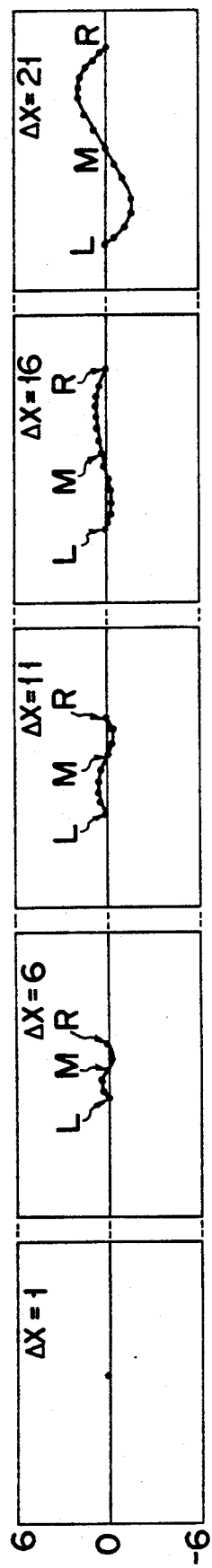
Figure 29B:
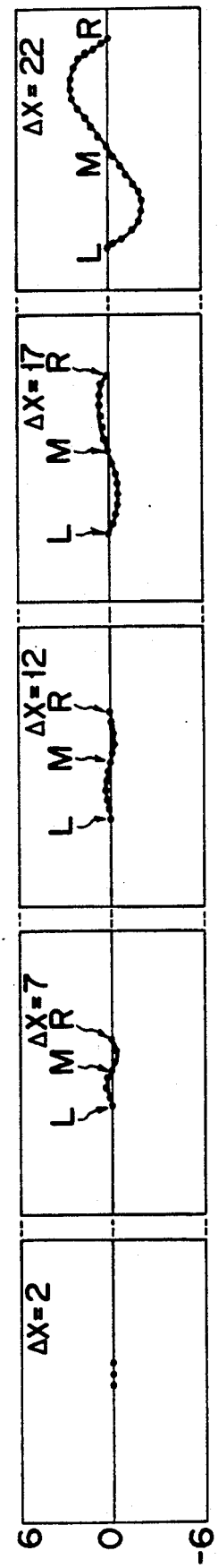
Figure 29C:
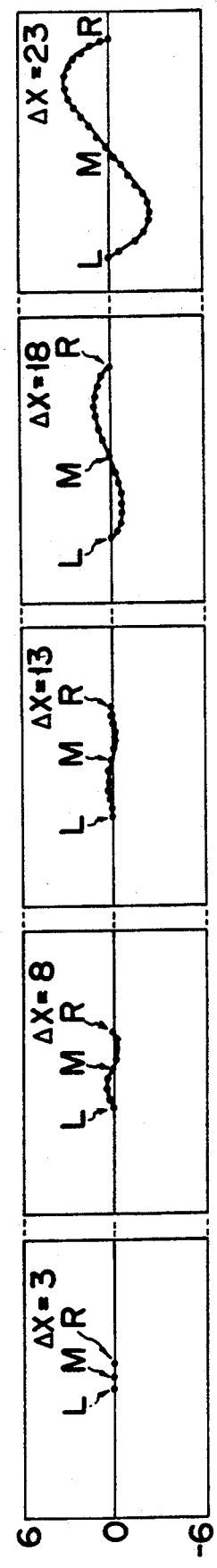

Interpolation errors include an error included in arithmetic operations and an error caused by image signal noise. The arithmetic error is a predetermined value determined by the interpolation interval $\Delta x$ and detection positions (to be referred to as interpolation positions) of the three values described above. Assuming that a focusing signal is represented by a Gaussian curve shown in FIG. 28 (in this case, a closest position is given as $x=0$ and an infinite position is given as $x=90$), errors caused by the interpolation interval and the interpolation positions are as shown in FIGS. 29A to 29E. An error amount is plotted along the ordinate, and the interpolation positions are plotted along the abscissa in each graph. Reference symbol L represents a case wherein two left points out of the three points have identical focusing signals as shown in FIG. 30A. Reference symbol M represents a case wherein two end points out of the three points have identical focusing signals, as shown in FIG. 30B. Reference symbol R represents a case wherein two right points out of the three points have identical focusing signals as shown in FIG. 30C.

Referring to FIGS. 29A to 29E, when $\Delta x = 14$, the arithmetic error becomes almost zero, and this value becomes an optimal value.

The error caused by the image signal noise appears as focusing signal noise, and a plurality of peaks appear in the focusing signal. For this reason, in order to prevent the interpolation operations from being influenced by noise, the interpolation interval $\Delta x$ must have a value larger than a given value.

As also described with reference to the first embodiment, the focusing signals are filtered to suppress their noise, and the condition for the minimum value of the interpolation interval $\Delta x$ can be rendered less strict. That is, when a filtering weighting coefficient is increased, the interpolation interval $\Delta x$ must be decreased. To the contrary, when the weighting coefficient is small, the interpolation interval $\Delta x$ must be increased. The minimum value of the interpolation interval $\Delta x$ determined by the weighting coefficient of filtering processing and the image signal noise is compared with the optimal value of the interpolation interval $\Delta x$ for minimizing the arithmetic error of interpolation to determine a true optimal value of the interpolation interval $\Delta x$. In addition, since the arithmetic error of interpolation is adversely affected by the shape of the focusing signal, the true optimal value of the interpolation interval xs is determined by a BPF band, an MTF of the photographing optical system, a focal length, an f-number, and the like.

A flow chart for detecting the optimal value under the above conditions is shown in FIG. 31. Referring to FIG. 31, the weighting coefficient in filtering processing and the luminance data of the BPF-filtered image signal are used to estimate noise of the focusing signal. The shape of the focusing signal is determined by the BPF band, the focal length, the f-number, and the MTF of the photographing optical system. An optimal value of the interpolation interval $\Delta x$ is determined by the estimated signal noise and the shape of the focusing signal.

Correction of an error caused during an interpolation operation will be described below.

As shown in FIGS. 29A to 29E, the in-focus position calculated using the interpolation interval $\Delta x$ and the interpolation positions includes a fixed error. On the other hand, since an interpolation position can be calculated by using the three values used in the interpolation operation, and the error amount can be determined. Therefore, the error amount is subtracted from the in-focus position obtained by the interpolation operation to obtain a correct in-focus position.

Assume $\Delta x = 20$. The error amount caused in the interpolation operation for $\Delta x = 20$ is shown in FIG. 29E, and the corresponding portion is extracted in FIG. 32A. As shown in FIG. 32B, assume that the obtained focusing signals are $g(x1)$, $g(x2)$, and $g(x3)$, and that an in-focus position calculated by these focusing signals is given as X. Note that $X1 + 40 = X2 + 20 = X2$, $g(x1) < g(x2)$ and $g(x2) < g(x3)$. The values of the X3, $g(x1) \leq g(x2)$ and $g(x2) > g(x3)$, or, $g(x1) < g(x2) \geq g(x3)$ signal $g(x2)$:

$$g_1 = g(x1)/g(x2), \quad g_3 = g(x3)/g(x2) \qquad (10)$$

then $$z_0 = g_1 - g_3 \qquad (11)$$

In equation (11), $z_0$ is a value on the Z-axis, as shown in FIG. 32A, and it is thus apparent that the error is $e(zO)$.

A true in-focus position $X_T$ can be obtained as follows:

$$X_T = X - e(zO) \quad (12)$$

The error caused by the arithmetic operation in interpolation processing can be corrected.

FIG. 33 shows an arrangement of an automatic focusing apparatus which employs the above interpolation method.

Referring to FIG. 33, reference numeral 151 denotes an image pickup element which can be read-accessed by a drive circuit 152. A ROM 153 stores a table of the values of the interpolation intervals $\Delta x$. The ROM 153 searches an optimal $\Delta x$ on the basis of a focal length f sent from a photographing optical system 31, an f-number F, luminance data E sent from a prephotometric circuit 94, a band b of a BPF 37, and a weighting coefficient w of filtering of a filtering circuit 45. A ROM 154 stores a table of error amounts $e(z_0)$ of the interpolation operation itself. The ROM 154 searches an error amount $e(z_0)$ corresponding to the interpolation interval $\Delta x$ sent from the ROM 153 and the interpolation position Z sent from a microprocessor 150 and outputs the corresponding error amount to the microprocessor 150.

When focus adjustment is started in the automatic focusing apparatus having the above arrangement, a prephotometric operation is started to set an accumulation time of the image pickup element 151. The luminance data of the object measured by the prephotometric circuit 94 is output to the ROM 153. At the same time, the focal length f of the photographing optical system 31, the f-number F, the band b of the BPF 37, and the weighting coefficient w of the filtering are input to the ROM 153. The ROM 153 searches an optimal interpolation interval $\Delta x$ on the basis of these input data and outputs the searched optimal interpolation interval $\Delta x$ to the microprocessor 150.

Detection of focusing signals is started, and filtering signals g(x) are calculated during the interval $x = \Delta x$ By using three values g(x1), g(x2), and g(x3) near the maximum value of the filtering signal g(x), the interpolation operation is performed by the microprocessor 150 on the basis of the equations (II) and (III), thereby calculating the in-focus position. The correct in-focus position $X_T$ is then calculated on the basis of equations (10) and (11). The photographing optical system 31 is moved to the in-focus position $X_T$ to perform focus adjustment.

According to this embodiment, the optimal interpolation interval $\Delta x$ is used, and the error caused by the interpolation operation itself is corrected in interpolation processing. Therefore, focus adjustment with very high precision can be performed.

The optimal interpolation intervals $\Delta x$ and the errors of the interpolation operations themselves are stored as tables in the ROMs 153 and 154, and storage data is detected on the basis of the image pickup state. Therefore, high-speed focus adjustment can be performed.

The seventh embodiment of the present invention will be described below.

This embodiment exemplifies focus adjustment utilizing a fuzzy inference to automatically select an area of the area sensor described with reference to the fourth embodiment and to perform focus adjustment of the selected area. Hardware of the seventh embodiment is similar to that of the fourth embodiment. In the seventh embodiment, a method of selecting an area subjected to focus adjustment will be described in detail.

Figure 34A:
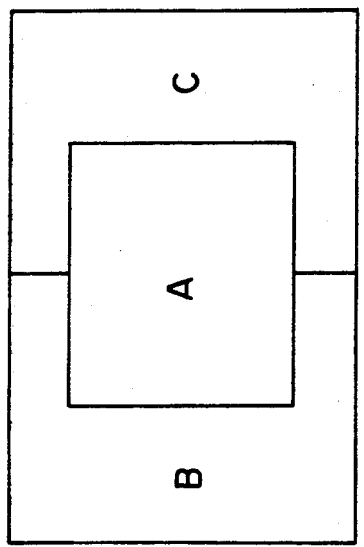
FIG. 34A is a view showing read areas of an image pickup element.

A, B, and C in FIG. 34A are distance-measuring areas representing distances to an object image. An operation for selecting an area subjected to focus adjustment from the above three areas A, B, and C on the basis of the fuzzy inference will be described below.

Figure 34C:
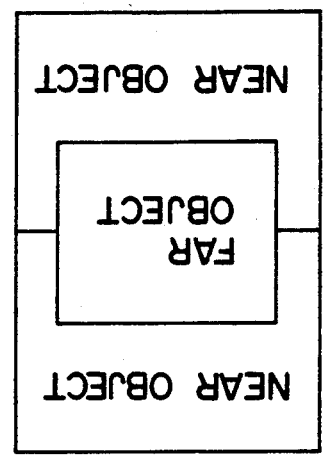
FIG. 34C is a view showing a modification of the read areas of the image pickup element.
Figure 34B:
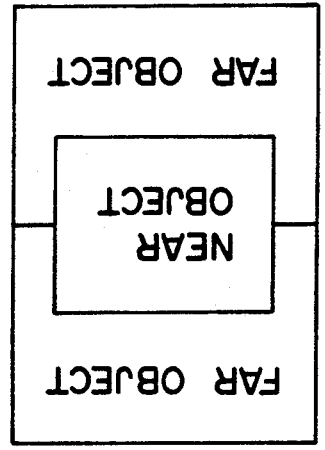
FIG. 34B is a view showing an object distance in the read areas.
Figure 35A:
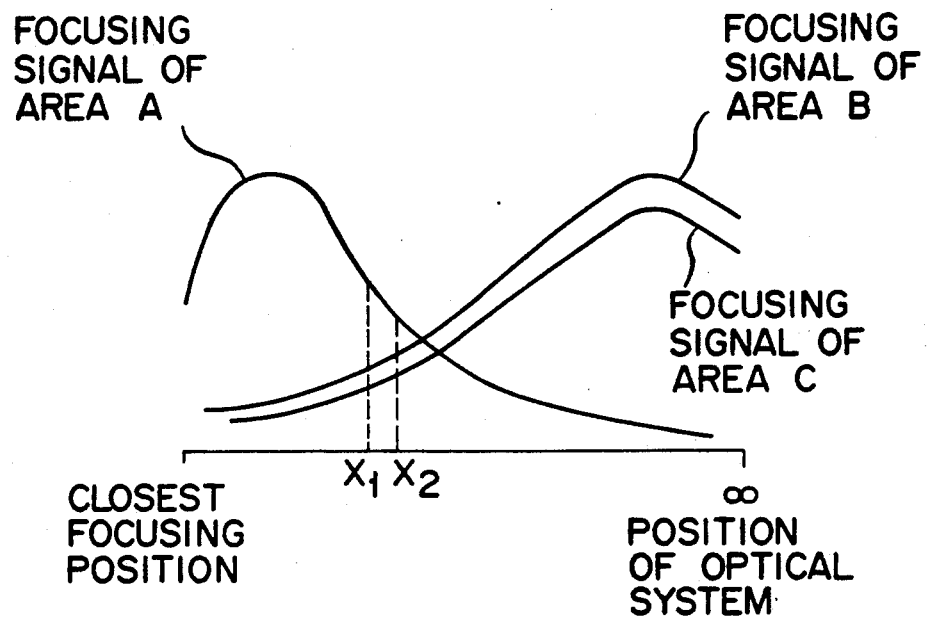
FIG. 35A is a graph showing an image signal when the object distance in the read areas is given as shown in FIG. 34B.
Figure 35B:
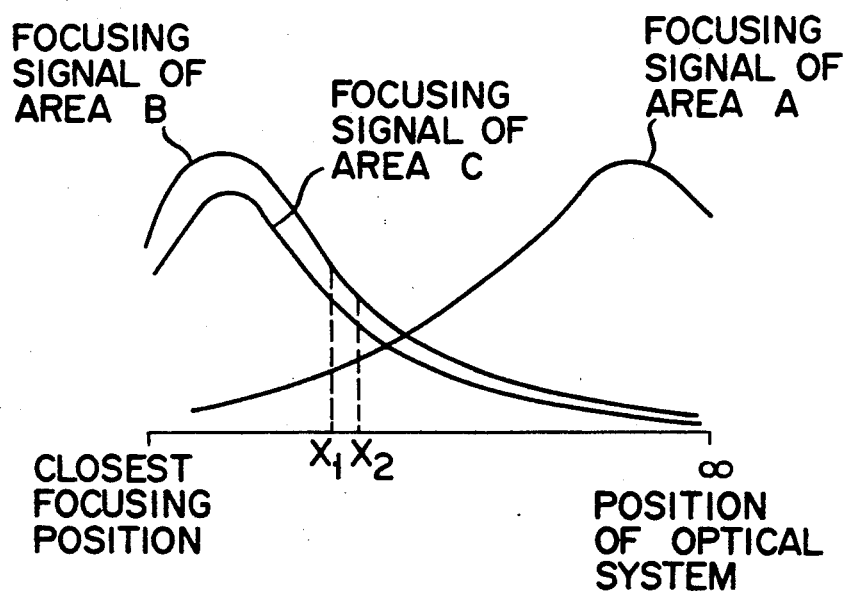
FIG. 35B is a graph showing an image signal when the object distance in the read areas is given as shown in FIG. 34C.

For example, as shown in FIG. 34B, a near object is located in the area A, and far objects are respectively located in the areas B and C. In this case, focusing signals are obtained, as shown in FIG. 35A. When a far object is located in the area A, and near objects are respectively located in the areas B and C, as shown in FIG. 34C, the focusing signals are obtained, as shown in FIG. 35B. The lens position serving as the position of the photographing optical system in each of FIGS. 35A and 35B is plotted along the abscissa.

When the lens is moved from a position $x_1$ to a position $x_2$, focusing signals of the areas A, B, and C change as follows.

State of FIG. 35A:
Focusing Signal of Area A: decreased
Focusing Signal of Area B: increased
Focusing Signal of Area C: increased
State of FIG. 35B:
Focusing Signal of Area A: increased
Focusing Signal of Area B: decreased
Focusing Signal of Area C: decreased In this embodiment, whether objects in the respective areas are far, near or medium objects are inferred from changes in focusing signals, focusing signal values, and the corresponding lens positions (inference 1). An area subjected to focus adjustment is determined by relationship between the areas and the types of objects (near, far, and medium objects) (inference 2).

Detailed rules of inference 1 are shown below.

Inference 1

| | Lens Position | Focusing Signal Value | Change in Focusing Signal | Conclusion |
|---|---|---|---|---|
| Rule 1 | near | large | 0 | near object |
| Rule 2 | medium | medium | negative | near object |
| Rule 3 | far | small | negative | near object |
| Rule 4 | near | medium | positive | medium object |
| Rule 5 | medium | large | 0 | medium object |
| Rule 6 | far | medium | negative | medium object |
| Rule 7 | near | small | positive | far object |
| Rule 8 | medium | medium | positive | far object |
| Rule 9 | far | large | 0 | far object |

This inference can be established when the lens is driven in the infinite direction. However, when the lens is driven toward the closest distance, the signs of changes in focusing signals are reversed. The focusing signal value is an average value of the focusing signal values at, e.g., positions x1 and x2, and the lens position is an average value between the positions x1 and x2.

Detailed rules of inference 2 are shown below.

Inference 2

Rule 1: If the area A includes a near object, select the area A.

Rule 2: If the area B includes a near object, select the area B.

Rule 3: If the area C includes a near object, select the area C.

Rule 4: If the area B includes a medium object and the area A includes a far object, select the area B.

Rule 5: If the area C includes a medium object and the area A includes a far object, select the area C.

The lens position, the focusing signal value, and the change in focusing signal described in the above rules are respectively defined as fuzzy sets by using membership functions, as shown in FIGS. 36A to 36D, respectively.

A detailed inferential method based on inferences 1 and 2 will be described below.

Figure 36A:
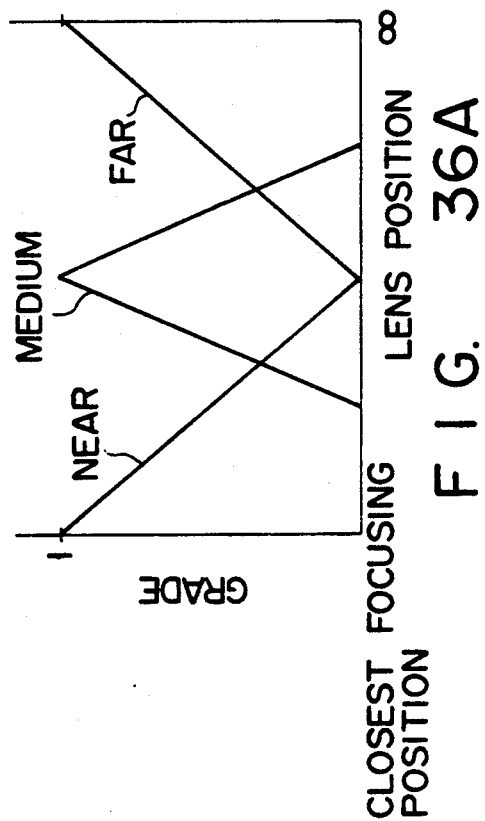
FIGS. 36A to 36D are views showing membership functions having different conditions, respectively.
Figure 36B:
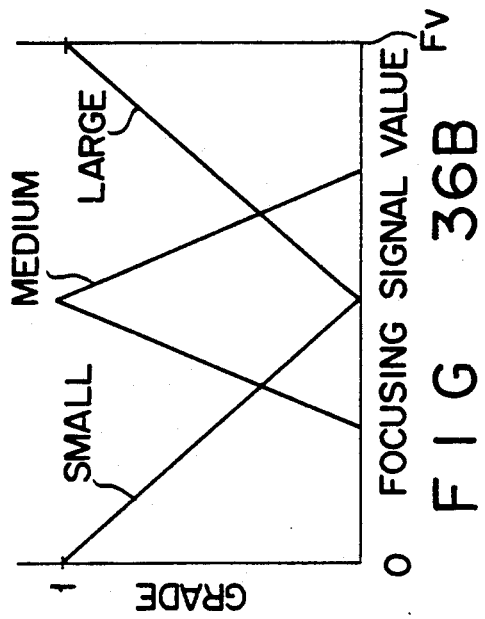
Figure 36C:
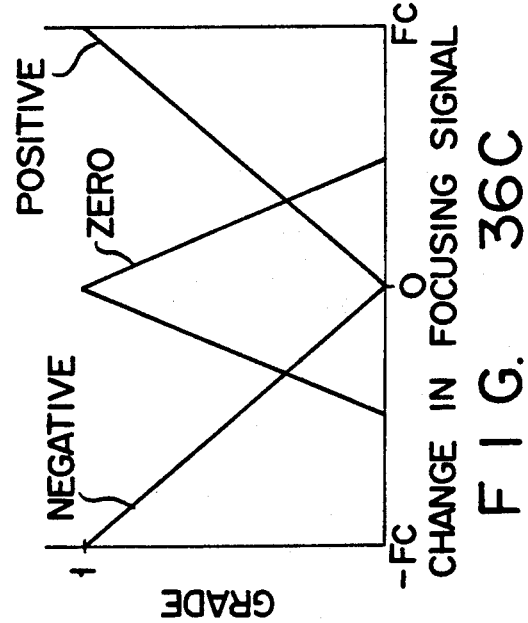

In inference 1, the grades of various conditions of the rules are obtained by the membership functions Fu, Fc is given by experience shown in FIGS. 36A to 36C, and minimum values of any conditions grades of the rules are given as $G_1, G_2, G_3, \ldots G_9$.

A maximum value of the minimum values G1, G2, and is defined as a plausibility of a near object, and a maximum value of the minimum values G7, G8, and G9 is defined as a plausibility of a far object. The plausibility of each area is thus determined.

In inference 2, by utilizing the plausibilities obtained in inference 1, grades of the rules are obtained. For example, the plausibility of the near object in the area A is given as a grade in Rule 1, and a smaller one of the plausibility of the medium object in the area B and the plausibility of the far object in the area A is given as a grade in rule 4. A rule giving a maximum value of the grade is determined as a correct rule, and an area to be selected is selected on the basis of the correct rule.

By utilizing the above fuzzy inference, an area subjected to focus adjustment is selected from the focusing signal values at two different positions and the position information of the photographing optical system.

An operation of this embodiment will be described below.

When focus adjustment is started, a prephotometric operation is performed in the same manner as in the fourth embodiment, and an accumulation time which does not impair image signals is set.

Addresses of the read areas A, B, and C of the X-Y addressed image pickup element 100 are sequentially set in a drive circuit 101 by a microprocessor 102. Charges accumulated in the areas A, B, and C are sequentially read as image signals, and arithmetic operations are performed to obtain focusing signals in units of the read areas A, B, and C. A photographing optical system 31 is moved to calculate focusing signal values gA(x1) and gA(x2) (for the area A), gB(x1) and gB(x2) (for the area B), and gC(x1) and gC(x2) (for the area C) at the two positions x1 and x2 of the photographing optical system 31. The fuzzy inference is executed by using the calculated focusing signal values to determine an area subjected to focus adjustment.

The image signals from the determined area are input to a BPF 37 and are processed in the same manner as in the fourth embodiment, thus performing focus adjustment.

According to this embodiment, since the area subjected to focus adjustment is selected by inference 1 having rules whose conditions are the position of the photographing optical system, the focusing signal value, and the change in focusing signal, and inference 2 having rules whose conditions are the information of a distance to the object and the object position, an area subjected to focus adjustment can be automatically selected from images including objects from a near object to a far object.

In the seventh embodiment described above, a predetermined area is selected from the three areas A, B, and C. However, the image area may be divided into two, or four or more areas.

The membership functions used above may be appropriately selected in accordance with various conditions (e.g., a focal distance and an f-number) of the photographing optical system may be corrected in accordance with the various conditions of the photographing optical system.

In the seventh embodiment, an average value of the focusing signal values at two different positions on the optical axis is used as a focusing signal value in the fuzzy inference. However, this average value may be normalized by, e.g., division of the average value by the luminance of the corresponding area, and the normalized value may be used as a focusing signal value.

Figure 36D:
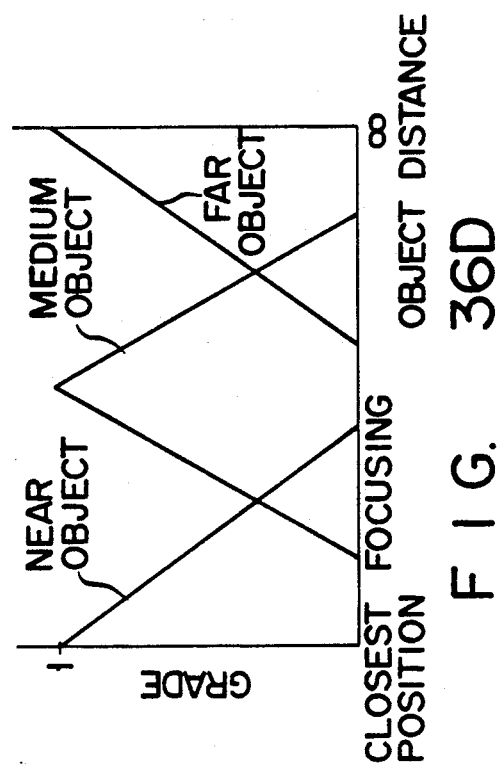
Figure 38:
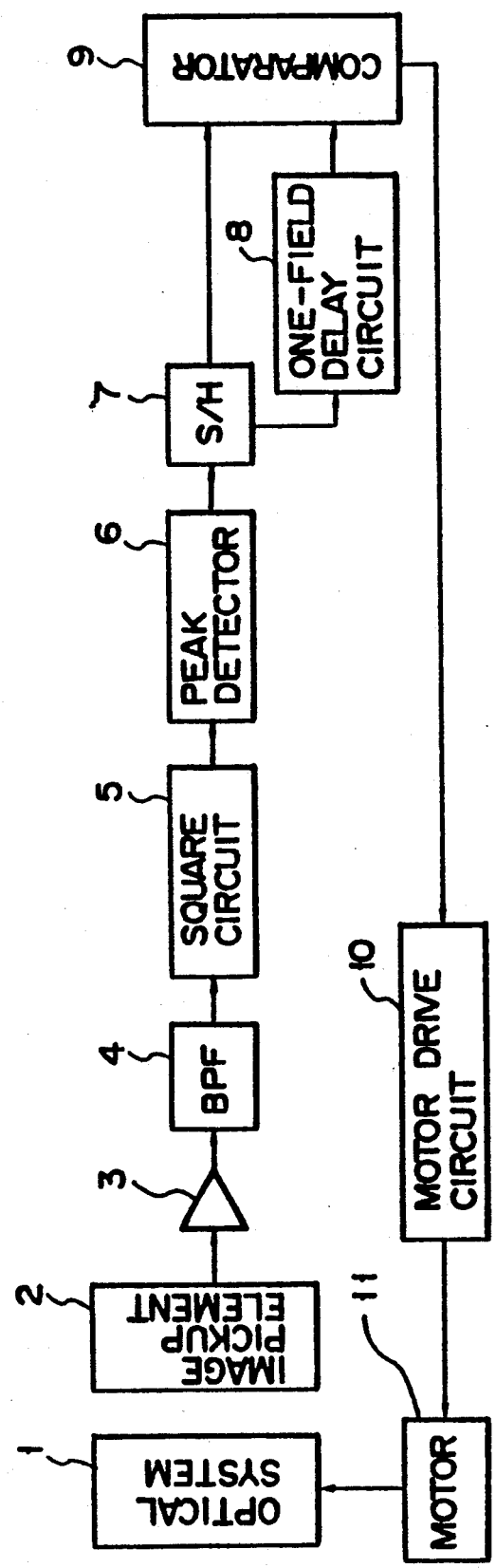
FIG. 38 is a block diagram showing an arrangement of an automatic focusing apparatus employing a hill-climbing scheme.
Figure 39:
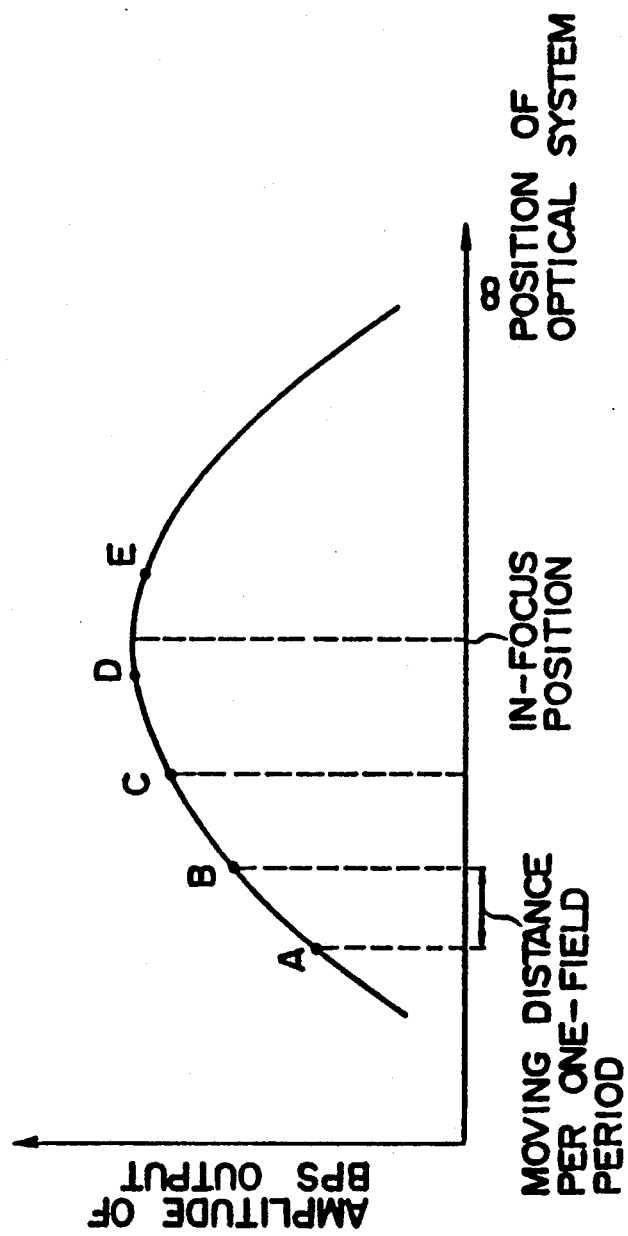
FIG. 39 is a graph showing a relationship between an in-focus position and an output amplitude of an image signal.
Figure 40:
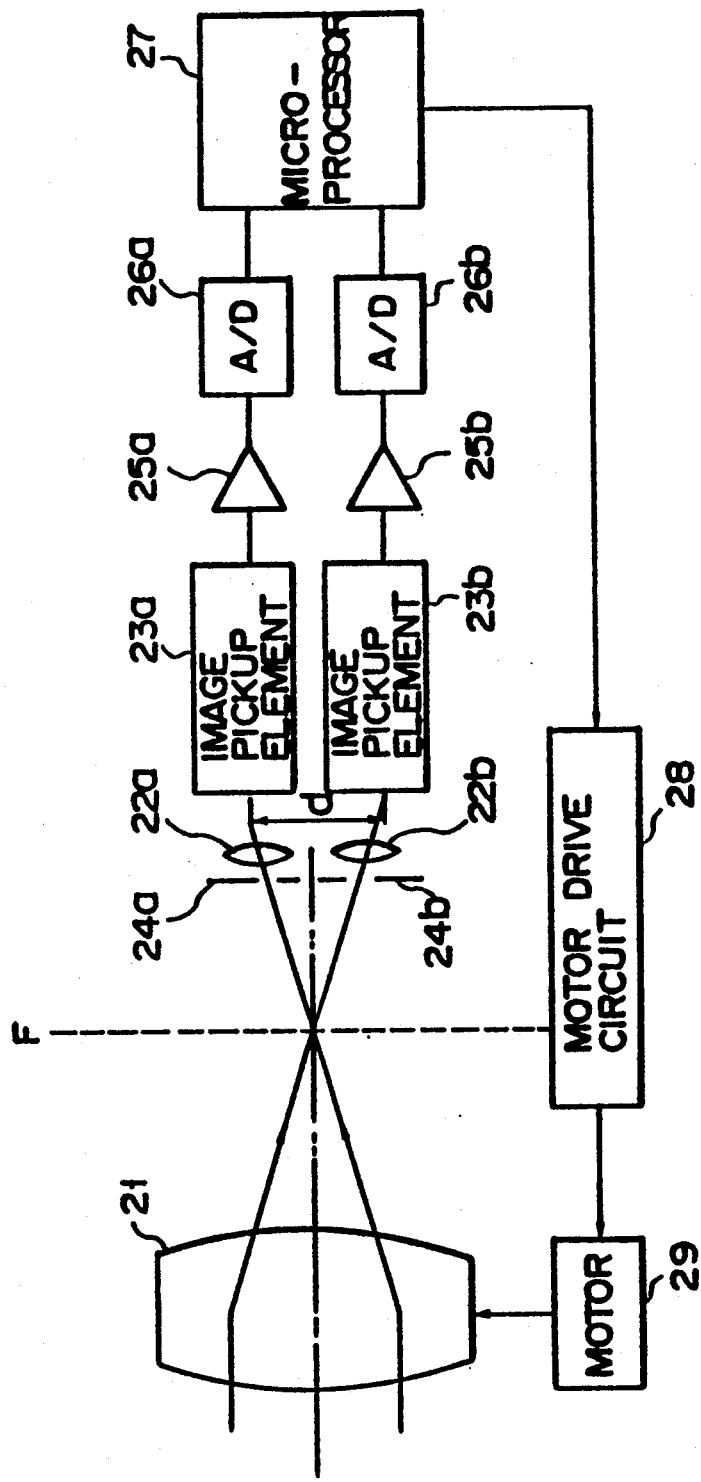
FIG. 40 is a block diagram of an automatic focusing apparatus employing a phase correlation scheme.
Figure 41:
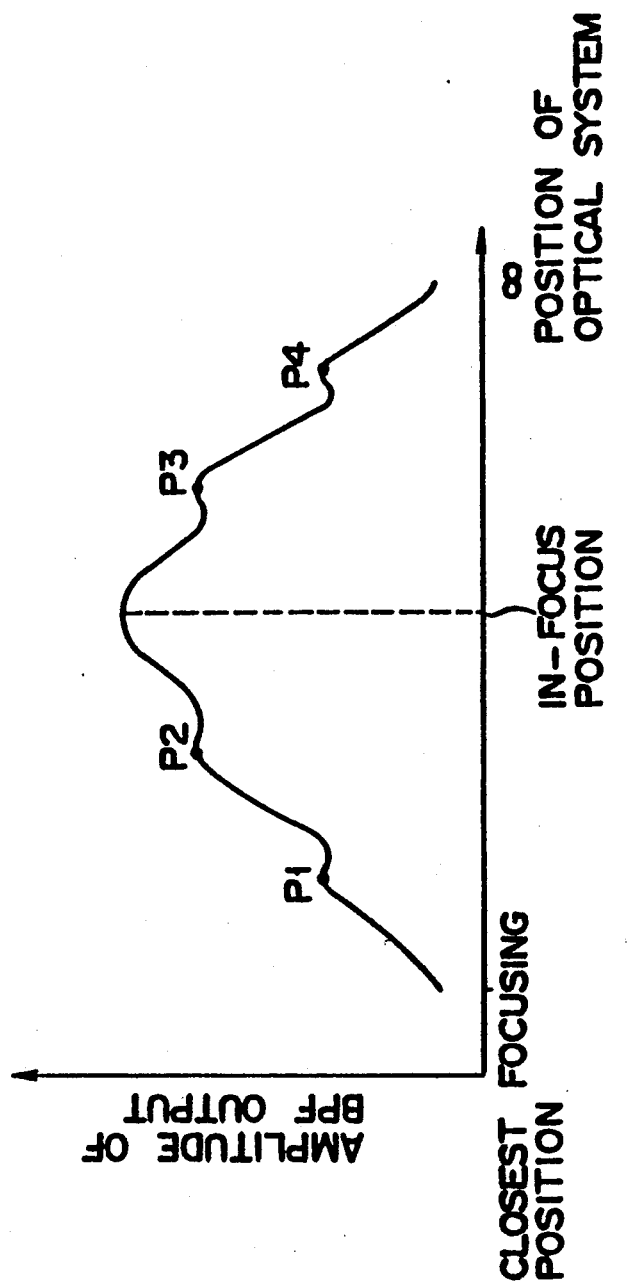
FIG. 41 is a view showing peaks appearing in the focusing signal.

The plausibility of each object obtained by inference 1 may be multiplied with the membership function shown in FIG. 36D, and a sum (hatched portion) of functions shown in FIG. 37B may be used to obtain the position of the center of gravity, thereby obtaining an object distance. The hatched portion in FIG. 37B is a portion representing the sum of functions multiplied with plausibilities. A plausibility value of a near object is 0.5, that of a medium object is 0.8, and that of a far object is 0.1.

In inference 2, the grades of the rules may be obtained by the membership function of FIG. 37A by using the object distances obtained by inference 1, and a rule which gives the maximum value may be selected from the selected rule.

The object distance obtained by inference 1 can be utilized for subsequent focus adjustment Estimation of the object distance by inference 1 can also be utilized for a line sensor or the like.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An automatic focusing apparatus comprising:
    a photographing optical system for forming an optical image of an object;
    an image pickup element for converting the optical image formed by said photographing optical system into an electrical signal;
    driving means for changing a relative position between said photographing optical system and said image pickup element;
    means for reading the electrical signals obtained at different relative positions as image signals while the relative position is changed by said driving means;
    frequency extracting means for extracting frequency components of the same specific frequency bands from the image signals sequentially read by said reading means;
    means for converting the frequency components extracted by said frequency extracting means to a signal having positive values;
    focusing signal generating means for adding the positive values to generate a focusing signal having values; and in-focus position operating means for selecting a predetermined signal value from the plurality of signal values of the focusing signal, for calculating the in-focus position by using the selected signal value, for calculating a defocus amount from the in-focus position, and for outputting a drive signal corresponding to the defocus amount to said driving means.

2. An apparatus according to claim 1, further comprising filtering means for filtering the focusing signal generated by said focusing signal generating means to obtain a filtering signal from which a high-frequency component is eliminated, and for outputting the filtering signal as the focusing signal to said in-focus position operating means.

3. An apparatus according to claim 1, wherein said image pickup element accumulates a charge for a predetermined charge accumulation time and outputs the accumulated charge as the electrical signal, and further comprising image signal correcting means for dividing the frequency components from said frequency extracting means by the charge accumulation time of said image pickup element and outputting a result signal to said focusing signal generating means.

4. An apparatus according to claim 1, wherein said focusing signal generating means comprises an integrator.

5. An apparatus according to claim 1, wherein said in-focus position operating means calculates an in-focus position by performing an interpolation operation using a maximum value of the focusing signal generated by said focusing signal generating means and said signal values among which the maximum value is interposed.

6. An apparatus according to claim 2, wherein said filtering means comprises:
a first-stage delay element which receives the focusing signal output from said focusing signal generating means,
a plurality of delay elements connected in series with said first-stage delay element,
a plurality of multipliers for multiplying outputs from said plurality of delay elements with a predetermined filter coefficient and outputting products, and
an adder for adding the products obtained by said multipliers and outputting a sum signal.

7. An apparatus according to claim 2, wherein said filtering means comprises:
a plurality of multipliers including preceding-stage and succeeding-stage multipliers for multiplying the input focusing signals with a predetermined filter coefficient and for outputting products,
a plurality of delay elements for delaying the products from said preceding-stage multipliers by predetermined delay periods, to generate delay outputs, and
a plurality of adders for sequentially adding the delay outputs from said delay elements to the products of said succeeding-stage multipliers.

8. An apparatus according to claim 2, wherein said filtering means comprises:
a FIFO memory for sequentially receiving the focusing signals and sequentially outputting the focusing signals in an input order,
means for calculating differences between the focusing signals output from said FIFO memory and the input focusing signals and outputting the differences, and adding means for accumulating the quotients from said calculating means.

9. An apparatus according to claim 5, wherein assuming that a signal level as a signal value of the focusing signal is plotted along a Y-axis, that a moving direction of said photographing optical system is plotted along an X-axis, that first and second points, between which a maximum value of the focusing signal is inserted, and which are spaced by a distance l, and defined in the Z-axis as Va and Vb, respectively, and that third and fourth points, between which the maximum value of the focusing signal is inserted and which are spaced by a distance l and are defined in the X-axis are as Vc and Vd, said in-focus position operating means calculates a line m parallel to the X-axis and crossing a line segment VaVc obtained by connecting the first and third points and a line segment VbVd obtained by connecting the second and fourth points;
assuming that an intersection between the line m and the line segment VaVc is given as C1 an that an intersection between the line m and the line segment VbVd is given as C2,
said in-focus position operating means sets a Y-axis position of the line m such that a distance L2 between the intersection C1 and the first point Va is equal to a distance L1 between the intersection C2 and the second point Vb; and
said in-focus position operating means calculates a middle point M of a line segment C1C2 on the line m as the in-focus position.

10. An apparatus according to claim 5, wherein said in-focus position operating means performs an interpolation operation as follows:

$$\text{when } g(X_{m-1}) \leq g(X_{m+1})$$
$$a = X_m + [\Delta X/2] \times [\{g(X_{m+1}) - g(X_{m-1})\}/\{g(X_m) - g(X_{m-1})\}]$$
$$\text{when } g(X_{m-1}) > g(X_{m+1})$$
$$a = X_m - [\Delta X/2] \times [\{g(X_{m-1}) - g(X_{m+1})\}/\{g(X_m) - g(X_{m+1})\}]$$

where the $a$ represents the in-focus position, a signal level of a signal value of the focusing signal is given as a Y-axis, a moving direction of said photographing optical system is given as an X-axis, the $g(X_m)$ is the maximum value of the focusing signal, a corresponding position on the X-axis is given as $X_m$, signal values, among which the maximum value of the focusing signal is interposed, are given as $g(X_{m-1})$ and $g(X_{m+1})$, and an X-axis interval of the three signal values is given as $\Delta X$.

11. An apparatus according to claim 5, wherein said in-focus position operating means comprises:
a ROM for previously storing an amount of interpolation error included in the in-focus position obtained by the interpolation operation; and
correction means for subtracting the amount of error stored in said ROM from the in-focus position obtained by said interpolation operation.

12. An apparatus according to claim 10, wherein said in-focus position operating means includes:
means for estimating the noise of the focusing signal;
means for obtaining a shape of the focusing signal; and
means for determining the maximum value of $\Delta X$ from the signal noise and the shape of the focusing signal.

13. An automatic focusing apparatus comprising:

a photographing optical system for forming an optical image of an object;

an image pickup element for converting the optical image formed by said photographing optical system into an electrical signal and for nondestructively reading the electrical signal;

driving means for changing a relative position between said photographing optical system and said image pickup element;

means for nondestructively reading the electrical signals at different relative positions as image signals from said image pickup element while the relative position is changed by said driving means;

frequency extracting means for extracting frequency components of the same specific frequency bands from the image signals sequentially read by said reading means;

means for converting the frequency components extracted by said frequency extracting means to a signal having positive values;

integral-focusing-signal generating means for adding the positive values to generate an integral focusing signal having a plurality of signal values;

focusing signal generating means for calculating a difference between the integral focusing signals and outputting a filtered focusing signal; and in-focus position operating means for calculating an in-focus position by using the plurality of signal values of the focusing signal, calculating a defocus amount from the in-focus position, and for outputting a drive signal corresponding to the defocus amount to said driving means.

14. An apparatus according to claim 13, wherein said converting means comprises a square circuit.

15. An apparatus according to claim 13, wherein said image pickup element accumulates a charge for the charge accumulation time and outputs the accumulated charge as the electrical signal, and further comprising photometric means, coupled to said image pickup element, for measuring a luminance of the object on the basis of the image signals, and means for setting timings for reading the image signals from said nondestructive image pickup element in accordance with the object luminance measured by said photometric means.

16. An apparatus according to claim 15, wherein said timing setting means sets a unit accumulation time corresponding to the timings for reading out the image signals from said nondestructive image pickup element, so that the unit accumulation time is a time for which the accumulated charge of said nondestructive image pickup element is not saturated.

17. An apparatus according to claim 15, further comprising means for resetting the charge of the nondestructive image pickup element every time the image signal is read when the accumulated charge of said nondestructive image pickup element is saturated within the set unit accumulation time due to a high luminance of the object, and for resetting the accumulated charge of said nondestructive image pickup element when the accumulated charge reaches a threshold value slightly smaller than a saturation value of the accumulated charge if the accumulated charge of said nondestructive image pickup element is not saturated within the unit accumulation time due to a low luminance of the object.

18. An apparatus according to claim 13, wherein said nondestructive image pickup element comprises an area sensor having an area corresponding to an arbitrary portion of the optical image and capable of reading the image signal from the area.

19. An apparatus according to claim 18, further comprising means for determining the area to be focused from the optical image by using a fuzzy inference, and means for reading the image signal from the area of said area sensor which corresponds to the area to be focused.

20. An apparatus according to claim 19, wherein the fuzzy inference has a first inference having rules whose conditions are a position of said photographing optical system, a signal value of the focusing signal, and a change in signal value of the focusing signal, and a second inference having rules whose conditions are information of a distance between said photographing optical system and the object, and a position of the object.

21. An apparatus according to claim 19, further comprising means for measuring a luminance of the object from the image signal read from an area of said area sensor which is determined by the fuzzy inference, and means for setting timings for reading the image signals from said area sensor on the basis of the object luminance measured by said photometric means.

22. An apparatus according to claim 13, wherein said converting means comprises an absolute-value circuit.

* * * * *